(12) United States Patent
Child

(10) Patent No.: US 8,521,738 B2
(45) Date of Patent: Aug. 27, 2013

(54) SYSTEM AND METHOD FOR CLASSIFICATION AND RETRIEVAL OF CHINESE-TYPE CHARACTERS AND CHARACTER COMPONENTS

(76) Inventor: Warren Daniel Child, Chevy Chase, MD (US)

(*) Notice: Subject to any disclaimer, the term of this patent is extended or adjusted under 35 U.S.C. 154(b) by 284 days.

(21) Appl. No.: 12/744,809

(22) PCT Filed: Nov. 25, 2008

(86) PCT No.: PCT/US2008/084750
§ 371 (c)(1),
(2), (4) Date: May 26, 2010

(87) PCT Pub. No.: WO2009/070615
PCT Pub. Date: Jun. 4, 2009

(65) Prior Publication Data
US 2010/0257173 A1  Oct. 7, 2010

Related U.S. Application Data

(60) Provisional application No. 60/990,166, filed on Nov. 26, 2007, provisional application No. 60/990,123, filed on Nov. 26, 2007, provisional application No. 60/991,010, filed on Nov. 29, 2007.

(51) Int. Cl.
*G06F 7/00* (2006.01)
*G06F 17/30* (2006.01)

(52) U.S. Cl.
USPC .......................................... 707/736; 382/187

(58) Field of Classification Search
USPC .......................................... 707/736; 382/187
See application file for complete search history.

(56) References Cited

U.S. PATENT DOCUMENTS

| 5,257,938 A * | 11/1993 | Tien ............................. 434/128 |
| 5,923,778 A * | 7/1999 | Chen et al. ..................... 382/185 |
| 7,257,528 B1 * | 8/2007 | Ritchie et al. ..................... 704/7 |
| 2007/0092326 A1 * | 4/2007 | Kim ............................. 400/472 |
| 2008/0232689 A1 * | 9/2008 | Lee ............................... 382/185 |

OTHER PUBLICATIONS

Babriel F. Groner et. al. "On-Line Computer Classification of Handprinted Chinese Characters as a Translation Aid". Dec. 1967. Electronic Computers IEEE Transactions. vol. EC-16 issue 6. pp. 856-860.*

Charles C. Tappert et. al. "The state of the art in On-Line Handwriting Recognition". Aug. 1990. Pattern Analysis and Machine Intelligence, IEEE Transactions. vol. 12 issue 8. pp. 787-808.*

Yuang Y. Tang et. al. "Offline Recognition of Chinese Handwriting by Multifeature and Multilevel Classification". Pattern Analysis and Machine Intelligence, IEEE Transactions. vol. 20 issue 5. pp. 556-561.*

\* cited by examiner

*Primary Examiner* — Robert Beausoliel, Jr.
*Assistant Examiner* — Michael Pham
(74) *Attorney, Agent, or Firm* — Cygnet IP Law, P.A.; Stephen W. Aycock, II

(57) ABSTRACT

Recurring components found in Chinese-type characters can be identified and classified by stroke count and free-endpoint count according to embodiments of the present invention. The bidirectional many-to-many relationships between characters and their components can be identified and recorded in electronic or non-electronic format and the recurring components can be ordered and retrieved according to stroke-endpoint value pair. In accordance with an embodiment, bidirectional many-to-many relationships between simple and composite components can be identified and recorded in an electronic or non-electronic format. An embodiment can provide a classification/retrieval method and apparatus for rapid search and retrieval of Chinese-type characters and their components based on stroke-endpoint value pairs and relationships between components and characters.

25 Claims, 9 Drawing Sheets

FIG. 4

SYSTEM AND METHOD FOR CLASSIFICATION AND RETRIEVAL OF CHINESE-TYPE CHARACTERS AND CHARACTER COMPONENTS

RELATED APPLICATIONS

This application claims the benefit of: U.S. Provisional Application No. 60/990,123, filed Nov. 26, 2007 and entitled "Method, Apparatus and Software For Classifying Chinese-Type Characters and Character Components to Facilitate Classification, Search and Retrieval"; U.S. Provisional Application No. 60/990,166, filed Nov. 26, 2007 and entitled "Modular Approach to Managing Chinese, Japanese, and Korean Linguistic Data in Electronic Contexts"; and U.S. Provisional Application No. 60/991,010, filed Nov. 29, 2007 and entitled "Method, Apparatus and Software for Classifying Chinese-Type Characters and Character Components to Facilitate Classification, Search and Retrieval", each of which is incorporated herein by reference in its entirety.

FIELD OF THE INVENTION

Embodiments of the present invention relate generally to the classification and retrieval of language characters and in particular to a system, method and apparatus for classifying Chinese-type characters and their constituent recurring components to facilitate retrieval.

BACKGROUND

The Chinese, Japanese, Korean, and Vietnamese languages have traditionally used writing systems that employ thousands of characters of Chinese origin. In addition, scholars in Japan, Korea, and Vietnam created additional characters of native origin that resemble Chinese characters in design. These latter characters are referred to as kokuji (Japanese-origin), gugja (Korean-origin) and chunon (Vietnamese-origin) characters. Because Chinese-origin and Chinese-like (kokuji, gugja, and chunon) characters are so numerous and operate on different principles from Western phonetic alphabets, there has always been a need to classify them systematically. (For conciseness, Chinese-origin and Chinese-like characters will hereinafter collectively be referred to as "Chinese-type characters.") In languages which still employ such characters—notably Chinese, Japanese, and Korean—that need continues to be felt today.

In one conventional technique, scholars have traditionally classified characters using a conventional set of character components known as radicals. Modern dictionaries today typically employ 214 radicals. The exact number of radicals employed, however, depends on the script type (simplified Chinese dictionaries sometimes list 227, 187, or 154), target audience (some modern dictionaries for normative speakers use fewer), and/or whether alternate radical forms are counted separately. The order in which radicals are listed in dictionary tables is determined by their stroke count, which is the number of pen strokes used to compose them. The order in which radicals having the same stroke count are listed is simply a matter of convention.

Radicals serve as a form of preliminary lookup key, roughly akin to the starting letter of a word in Western language dictionaries. To look up a character in a dictionary using the traditional radical system, the first step is to determine which portion of the character constitutes the radical, and then count the remaining strokes in the character. For instance, to look up 儆, one first recognizes that it will be classified under the 2-stroke man radical 亻. The next step is to count the number of remaining strokes. In this case the residual stroke count is 12. Finally, one searches the dictionary section containing man radical characters containing 12 residual strokes. The result will be a set of characters selected by the radical and residual-stroke-count search criteria. (Selections of characters resulting from a query are hereinafter referred to as a "search result set" or simply "result set.") For the example just cited, one major dictionary has a search result set comprising 14 characters; the Unicode table of characters would yield a result set of over 40 characters.

One of the flaws of the radical system is that the number of characters selected by the combination of radical and residual-stroke-count as search criteria may often be large. (Note that some dictionaries use total-stroke count instead of residual-stroke-count, but for any given domain of characters the result sets are identical.) A second flaw is that many characters are not as straightforward as in the above example. Some guesswork may be needed to determine which portion of the character constitutes the radical: sometimes there is more than one apparent candidate, and sometimes there are no obvious candidates.

A second conventional approach to speeding the search for characters using the radical system has been to classify the radicals into the position within a character where they are found. Thus, for instance, the New Nelson Japanese Dictionary presents separate charts of radicals for those found on the left, right, top, and bottom of characters, respectively. This enables one to find a radical a little more quickly, though it has no effect on the number of characters referenced by that radical, nor does it help with cases where it is unclear which portion of the character may constitute the radical.

A third conventional approach to classifying Chinese-type characters, embodied in a dictionary by Hadamitzky & Spahn and designed mainly to help normative speakers, reduces the standard radical set by eliminating some of the less commonly used radicals and then placing characters traditionally classified under the now the eliminated radicals into some other radical group. While this approach may help people who struggle with some of the quirks of the classification system for rare radicals, it still does nothing to reduce the size of the search result set and in fact may increase that size.

In a fourth conventional approach to classifying characters, described in 2001 Kanji by Francis DeRoo, characters are found by looking at a set of approximate shapes for the top or top-left, and another set of shapes for the bottom or bottom-right, and thereby determining a number that corresponds to those shapes. This approach requires some skill to master, as not all of the gestalt shapes are readily apparent when compared with the actual character shapes in question. This approach has also only been developed for a small set of characters (2001 Japanese characters) and so is not readily adapted to larger sets of characters. Moreover, the lack of popularity of this system may attest to its flaws.

A fifth conventional approach, known as the Four Corners Classification, classifies characters according to the basic shapes of their corners, with various shapes being associated with one of the digits from 0 to 9. This method entails a high level of ambiguity in deciding which shape code to apply, and is extremely difficult to master. Its lack of popularity may also attest to these shortcomings.

A sixth conventional approach to classifying characters, also embodied in the New Nelson Japanese Dictionary, is to provide an intermediate table so that if a user guesses the wrong component for the radical, the user will still be redirected to the appropriate character. While this sort of cross-referencing helps alleviate some of the problems with guessing the correct radical where two candidates appear equally good, it does nothing to solve the problem where none of the character's components looks like one of the standard radicals, nor does it do anything to diminish the size of the search result set. It also may create a need for an intermediate stage in the search process, causing the user to expend more time.

A seventh conventional approach, found in many dictionaries, is to provide a list of characters ordered by their pronunciation, so that if a user does not know which radical to use as the key, the user can find it by its pronunciation. When native speakers do know the pronunciation of a character, they frequently use such indexes by reading for the simple reason that the radical system is often inadequate. Unfortunately, because of the large number of homonyms among Chinese-type characters, the number of characters selected by the system is often quite large, and so search time is still slow. Moreover, such an index is of little or no use when the user does not know how to pronounce the character. This can occur with both native and non-native speakers of the language.

An eighth conventional approach, found in software applications like KanjiLite, is to provide a chart of radicals in the form of a table. A user may click on one or more radicals in the table, and the returned selection will consist of characters containing the radicals selected. Unfortunately, this approach has not been applied outside of Japanese, and is of little or no help in cases where there is no apparent radical. Moreover, as in some of the above-mentioned methods, the search result set of characters may be quite large. Finally, there are many character components that do not constitute radicals, thus making this system inappropriate for all applications.

Various East Asian language input methods devised in recent years typically include input methods that attempt to map Chinese-like characters to a keyboard or a numeric keypad, and so unlike the present invention they cannot be used in non-electronic formats or contexts. Moreover, none of the input methods devised to-date employ the specific classification techniques provided by the present invention. It should be noted in brief, however, that input methods like CangJie, DaYi, and Boshiami are all based on the shape representation principle whereby a few dozen shapes are used to represent a large variety of character components (graphemes). Because such systems are unintuitive, they may require much time to master and are rarely used except by professionally trained typists.

To understand how the present invention overcomes the limitations outlined above, one must appreciate that while modern-day radical systems consist of approximately 200 character components (214 is standard), Chinese-type characters contain many more recurring components that have not been included in any version of the radical system. To date there has not been a particularly efficient way developed to categorize all of the recurring components found in Chinese-type characters, and lexicographers and linguists have never settled on a standardized set the way they have for radicals. However, because non-radical recurring components are generally less common than radicals, if used as a lookup key, they would lead to a far smaller selection of resulting characters. A handful of sources have at times listed non-radical components in a table. For instance, Chinese Characters by L. Wieger classifies many characters around non-radical recurring components. Unfortunately, he provides no convenient way to find characters using that method. Genealogy of Chinese Characters by R. Harbaugh attempts to classify recurring components as deriving from simpler radical forms. Unfortunately, this method suffers from the same irregularities and ambiguities as the radical system itself or the system used by DeRoo cited earlier. One obvious drawback to these approaches is that they are unwieldy, for simply finding a non-radical recurring component entails looking through many hundreds of components instead of only 214 (Japanese, Korean, traditional Chinese) or 224 (simplified Chinese), as is the case with the radical system. And so the time saved in reducing the size of the resulting selection is lost in finding the correct lookup key.

Embodiments of the present invention may address one or more of the above limitations by providing a way to find radicals, non-radical recurring components, and characters far more quickly than in any method previously devised. As a result, the invention makes it far easier to find characters in any system that incorporates this classification and lookup feature, and can therefore be used in a wide variety of electronic and non-electronic contexts, including dictionaries (both printed and electronic), lexical databases, and input methods. Further, an embodiment of the present invention allows one to combine multiple lookup keys when searching a character, thereby adding flexibility and ease of use for cases where determining the correct radical might be difficult, and aiding non-native speakers who might be at a loss as to how to find a character.

In accordance with one embodiment of the present invention, recurring components found in Chinese-type characters are identified, classified by stroke count, and then further classified by the number of free endpoints that they contain. Subsequently, Chinese-type characters are linked to a plurality of recurring components in the form of key-ordered pairs, taking into account the possibility of many-to-many relations (or relationships) among the characters and their constituent components. The result is an intuitive and highly efficient method, system, and/or software for classifying Chinese-type characters and their components in both electronic and non-electronic formats and applications that enables a user to easily find a target component and/or its associated characters.

SUMMARY

One exemplary embodiment includes a method for computerized classification and retrieval of characters in a domain of characters having recurring character components. The method comprises providing a database including the domain of characters, and identifying, within the domain of characters, a plurality of recurring character components. The method also includes identifying a stroke count for each of the recurring character components and identifying an endpoint count for each of the recurring character components. Once the stroke and endpoint counts are determined, each of the recurring character components can be classified according to a stroke-endpoint value pair determined for that recurring character component, the stroke-endpoint value pair being based on the stroke count and endpoint identified for that recurring component. The relationships between each recurring character component and one or more characters can be identified, a relationship being identified when a character includes the recurring character component.

The method can include recording identified relationships in the database by storing a plurality of relational entries in the database, each relational entry corresponding to an association between a recurring character component and respective related characters; and receiving an input stroke-endpoint value pair via a user interface and using the received stroke-endpoint value pair to access the database and retrieve a group of one or more of the recurring character components corresponding to the received stroke-endpoint value pair.

The method can include generating a group of one or more recurring character components corresponding to the received stroke-endpoint value pair, and receiving, via the user interface, an indication of a selected target recurring character component from among the group of recurring character components corresponding to the received stroke-endpoint value pair.

The method can also include retrieving characters in the database having a relationship to the target recurring character component; and generating a list of characters based on the target recurring character component and providing the list of characters to the user interface as output.

Another embodiment is an electronic dictionary including a processor, a memory coupled to the processor and having stored therein a database. The database contains a plurality of character records, a plurality of recurring character component records each including a primary stroke-endpoint value pair, and a plurality of relation entries associating a recurring component with one or more character records. The electronic dictionary also includes a display device coupled to the processor; and an input device coupled to the processor.

The memory includes instructions that when executed cause the processor to perform a series of steps including:
receiving an input stroke-endpoint value pair via the input device and using the received stroke-endpoint value pair to access the database and retrieve a group of one or more of the recurring character components corresponding to the received stroke-endpoint value pair;
displaying the group of recurring character components on the display device;
receiving, via the input device, an indication of a selected target recurring character component from among the displayed group of recurring character components;
retrieving characters from the database having a relationship to the target recurring character component; and
displaying the retrieved characters.

Another embodiment is a method for generating an index of characters in a domain of characters having recurring character components. The method includes providing a domain of characters and identifying recurring character components that occur within the domain of characters. For each recurring character component the method further includes determining a stroke count for each recurring character component, and determining an endpoint count for each recurring character component. The method includes classifying each of a plurality of recurring character components according to a stroke-endpoint value pair corresponding to the stroke count and endpoint count determined for that recurring character component; and identifying relationships between each recurring character component and one or more characters, the relationships being identified when a character includes the recurring character component.

The method also includes recording identified relationships in the database by storing a plurality of relational entries in the database indicating associations between recurring character components and their respective related characters; and, for each stroke-endpoint value pair, accessing the database and retrieving a group of one or more recurring character components corresponding to the stroke-endpoint value pair, and generating a list of characters related to each of the recurring character components associated with the stroke-endpoint value pair. Finally, the method includes generating the index ordered according to stroke-endpoint value pair and having a plurality of sections, each section being based on one of the stroke-endpoint value pairs and including subsections based on recurring character components associated with the stroke-endpoint value pair, each recurring character component further containing a listing of the characters associated with that recurring character component.

BRIEF DESCRIPTION OF THE DRAWINGS

FIG. 4 shows an exemplary graphical user interface for enabling a user to input search target data and review output result sets;

BRIEF DESCRIPTION OF THE TABLES

Figure 1A:
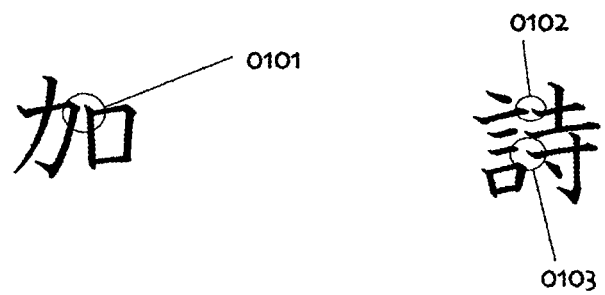
FIG. 1a illustrates an example of "false abutments"

Table 1 shows cases of how characters can be assigned to a core component;

Table 2 shows a few examples of core components and their associated character families;

Table 3 shows single strokes and their {stroke.endpoint} values in accordance with Rule 2 of the endpoint conventions set forth below;

Table 4 shows simple components having no abutments, together with their {stroke.endpoint} values, in accordance with Rule 4 of the endpoint conventions set forth below;

Table 5 shows components having one abutment (one lost endpoint) together with their {stroke.endpoint} values, in accordance with Rule 5 of the endpoint conventions set forth below;

Table 6 shows components with no free endpoints together with their {stroke.endpoint} values, in accordance Rule 6 of the endpoint conventions set forth below;

Table 7 shows an example of how a character search result set realized by the present invention is greatly reduced compared to that found when using the traditional radical system;

Table 8a shows a typical result set of radicals according to the traditional stroke-count search method;

Table 8b shows how application of the {stroke.endpoint} search method to radicals greatly downsizes the result set;

Table 9 shows a tabular listing of radicals;

Table 10 shows a tabular listing of non-radicals components;

Table 11 shows an example of how a composite component can be associated with simpler components;

Table 12 shows how assigning {stroke.endpoint} values to characters can facilitate the search of characters whose traditional radical is not readily apparent even to experienced users;

Table 13 shows how characters or components with ambiguous stroke counts can be resolved by providing alternative stroke counts so as to furnish a margin of error for the user;

Table 14 shows how characters or components with ambiguous endpoint counts can be resolved by providing alternative endpoint counts so as to furnish a margin of error for the user;

Table 15 shows how naming or assigning meanings to recurring elements can provide an additional tool for searching elements; and Table 16 shows how different script versions of recurring components can be cross-referenced in paper-based formats.

DEFINITIONS

As used herein: "CJKV writing system" refers to any orthography that employs Chinese-type characters, including modern-day simplified and traditional Chinese, older Chinese scripts employing oracle bone, bronze, small seal, greater seal, and clerical characters, modern and old Japanese, modern and old Korean, and old Vietnamese, or the like;

"Chinese-type character" refers to any Chinese-origin or Chinese-like character;

"Chinese-origin character" refers to any character originating in China since the advent of Chinese writing, including but not limited to oracle bone, bronze, lesser seal, greater seal, clerical, traditional, and simplified Chinese characters, regardless of whether said character is used in Chinese, Japanese, Korean, or Vietnamese chunon;

"Chinese-like character" refers to any character of Korean, Japanese, or Vietnamese origin, or the like, resembling Chinese-origin characters in construction and which may be respectively known as gugja, kokuji, and chunon;

"domain of characters" and, interchangeably, "character domain" refer to any set of characters extracted from any of said CJKV writing systems, including but not limited to
  a. all known characters in said CJKV writing systems;
  b. the characters identified by any computerized character set including but not limited to any form of Unicode, shift-JIS, Big-5, Guobiao, and other Chinese, Korean, or Japanese encoding scheme;
  c. the characters found in one or more dictionaries;
  d. the characters found in one or more text corpuses; and
  e. a particular selection of characters used for specific purposes, including but not limited to pedagogical purposes;

"grapheme" refers to any identifiable graphical element having semantic, phonetic, or other significance found to recur as a constituent portion of the Chinese-type characters found in a character domain;

"component" or "recurring component" refers to any grapheme used to compose characters in a domain of characters, including but not limited to traditional radicals, the radicals found in modern radical schemes, non-radical graphemes, composite graphemes, and elemental graphemes;

"core component" refers to any component around which a family of characters may be grouped in accordance with the methods outlined herein;

"radical" refers to one member of a limited set of components used in traditional or modern radical lookup schemes to search for characters;

"stroke count" refers to the number of strokes used to compose a Chinese-type character or character component using traditional reckoning principles;

"endpoint count" refers to the number of free endpoints contained in a Chinese-type character or character component as described under the conventions listed in the specification;

"stroke-endpoint value pair" refers to the pairing of a stroke count and endpoint count for a particular Chinese-type character or character component; and "stroke-endpoint classification" refers to the application of stroke-endpoint value pairs to a set of Chinese-type characters or character components.

DETAILED DESCRIPTION

Chinese-type characters can be considered to be composed of different components or conceptual levels. At a lowest level are individual strokes, which may be straight or curved or angular. At a next highest conceptual level, are combinations of strokes that produce a significant component. Such components, sometimes referred to as graphemes, are used repeatedly in the body of orthographic units called characters and tend historically to be of semantic or phonetic import. Finally, at a next highest conceptual level, simple graphemes may be combined to form composites or composite graphemes. Composite graphemes are also found repeatedly in the body of CJKV writing systems and may also provide phonetic or semantic information about the character.

For simplicity, as used herein, the term stroke refers only to the straight, curved, or angled "strokes of the pen or brush" used to write characters; and the term recurring component refers to any grapheme that occurs on a repetitive basis in the body of Chinese-type characters, regardless of whether the component is elemental (indivisible) or composite (composed of smaller components). Note, further, that some recurring components may in and of themselves constitute characters, the latter being the units used to form words and generally serving as morphemes.

For the purposes of explaining the exemplary embodiments described herein, and as a method of the present invention, it is helpful to explain the notion of a core component and a method for determining core components. The core component of a character can be determined according to the following method, which refers to Table 1:

Method for Determining a Character's Core Component
1) If the entire character is a recurring component, then the entire character is the core component (Table 1, Row 1).
2) If the character consists of two recurring components, and if one of these components is a radical and the other is a non-radical, then the core component is the non-radical portion of the character (Table 1, Row 2).
3) If the character has two constituent components both of which are found in the set of components known as radicals, then the core component is
  a. the less common of the two components if one is significantly less commonly used as a recurring component than the other (Table 1, Row 3);
  b. the component considered to serve as a phonetic if both are equally or nearly equally commonly used as recurring components (Table 1, Row 4).
4) If the character has more than two components, then the least commonly occurring of the constituent components will be deemed the core component provided that it meets the definition of a recurring component (Table 1, Row 5).
5) If all the graphemic constituents of a character are wholly unique, making it impossible to group the character into a family of characters sharing a common grapheme, then the entire character is its own core component (Table 1, Row 6).

Although the above listing of rules may at first glance make the notion of a core component appear to be complicated, in fact, it can be quite intuitive even for novice users. Because the vast majority of characters contain a radical and a non-radical component, identifying the core component for these characters is relatively straightforward: the core component is the non-radical component.

By employing the core component method of this invention, it is possible to group characters into families of characters that share a common core component. The rows in Table 2 illustrate sample character families formed by the core component principle of this invention. Note that in cases where the core component constitutes a "phonetic" component, a character family may correspond to what is traditionally referred to as a xiesheng series, wherein characters are grouped around a phonetic component. However, because many characters do not have phonetic components, the notion of xiesheng series cannot alone be used for grouping characters systematically for the purposes of this invention. By contrast, the core component methods of the present invention are able to group characters in a way that handles characters regardless of whether they contain a phonetic component.

Figure 5:
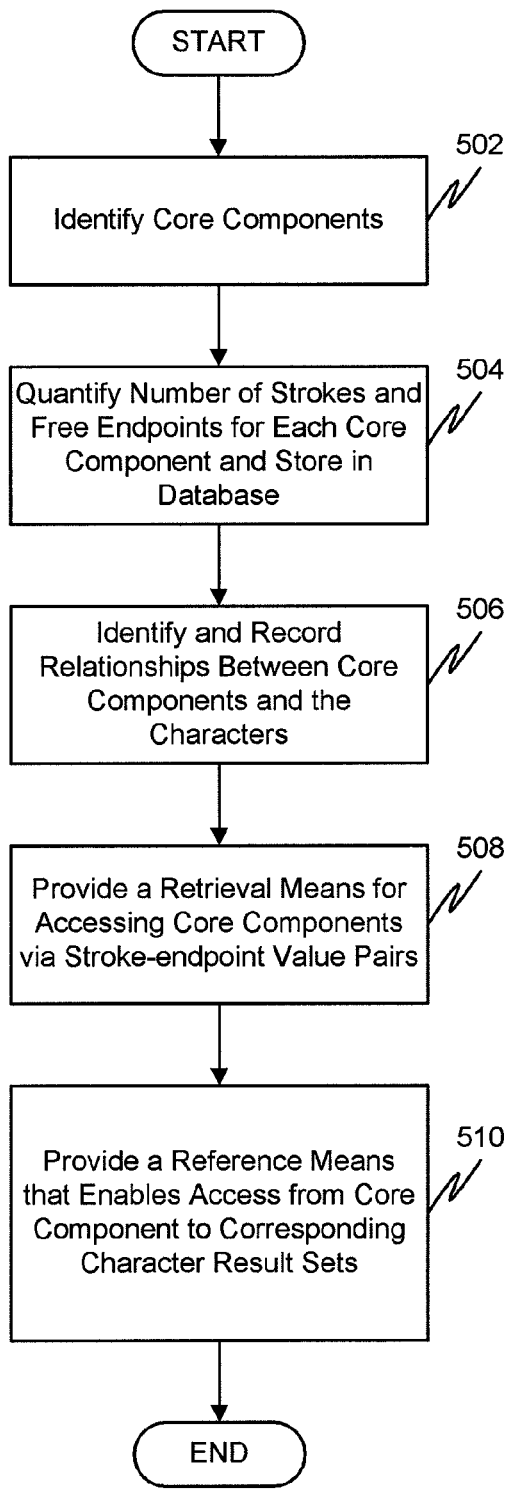
FIG. 5 shows a flowchart of an exemplary method for classification and retrieval of characters.

For example, as shown in FIG. 5, five steps can be taken to create a first and most basic exemplary embodiment of the present invention. The first step (502) is to identify the core components (or other recurring components) that are found in the selected domain of Chinese-type characters. The actual number of components depends on the domain of characters to which the embodiment is being applied. In most large sets of characters, for example, one can expect approximately 800-900 core components to exist. Practically, it is useful to restrict oneself to the components found and identified in the domain of characters identified by some predetermined body of characters, for example, including but not limited to versions of Unicode, shift-JIS, Big-5, Guobiao (GB), Korean or Vietnamese encodings, characters in an East Asian language dictionary, characters provided for use in an input method, or even some limited domain of characters assembled for pedagogical purposes. In other words, an encoding scheme or other pre-existing body of characters may form the group or domain of characters to which the classification and retrieval embodiment is being applied.

A second step (504) is to quantify the number of strokes and the number of free endpoints found in each core component. Stroke counts are determined using the traditional reckoning of what constitutes a stroke, as the method is well-known and established by convention. The process of counting and determining free endpoints, however, is believed to be unique and constitutes one of the major advances of the present invention and is described below in detail. Quantifying endpoints greatly reduces the number of components selected by the stroke count. Likewise, using non-radical components greatly reduces the number of characters selected in the search based on a stroke-endpoint value pair.

A third step (506) is to identify and record the relations between core components and the characters in which they are found. Such a linking or relational association can take a variety of forms such as a printed list generated according to a method of the present invention and having two or more columns wherein one column lists core components and the other lists corresponding characters in that core component's family; a table of appropriately ordered components with page numbers to the result set characters; or a relational database that establishes the aforementioned relations through fields and linking tables that establish the one-to-many relationships involved. In a complete implementation all core components can be identified, and all characters can be duly noted as being associated with a core component as described under the above method. The result of identifying and recording the relationships between core components and characters is that characters can be viewed as grouped into families, such that a relatively small set of characters is associated with each core component. This is in stark contrast to the large number of characters typically associated with a radical.

A fourth step (508) is to provide a means for conveniently accessing core components. In paper-based formats, the accessing means could consist of a table generated according to an embodiment of the present invention in which core components are listed in stroke-endpoint order. In an electronic format, the accessing means could be achieved by providing an interface for entering stroke count and endpoint values, at which point a table of records containing core components and their associated stroke-endpoint values would be accessed and the corresponding candidate result set displayed. An interface can include a graphical user interface (GUI), a text-based interface, another type of alpha-numeric interface, an input device interface (such as a keyboard, mouse, stylus, or the like), an audio (e.g., microphone)/visual (e.g., video camera) interface, and/or the like. Devices suitable for use with the method are described in detail below with respect to FIG. 8.

A fifth step (510) is to provide a reference means that enables access from core components to corresponding character result sets. In paper-based formats, a reference means may be established, for example, when the list of core components, generated according to an embodiment of the present invention, contains a column of reference numbers or of page numbers or simply of characters belonging to the family. In an electronic or computer-based embodiment, the reference means may include an interface, such as a graphical user interface, by which the user could first locate a core component and from the core component, access the list of characters in that component's family.

An exemplary method for determining endpoint counts is set forth in detail below:

Method for Determining Endpoint Counts

1. Components can be classified by their stroke count and the number of free endpoints that they contain (a stoke-endpoint value pair). This combination of values for the purposes of this specification will be notated as {stroke-countendpoint} (abbreviated as {s.e}). Thus, for example, an {s.e} notation of {2.3} indicates a component with two strokes and three free endpoints. Other notations conveying the same information may be used herein, including but not limited to [2.3], [2-3], (2-3), (2, 3), {2-3}, and the like, and all are intended to represent the stoke-endpoint value pair.
2. By definition, all single stroke components have two endpoints, the start point and the endpoint (Table 3). Accordingly, they are notated as {1.2}.
3. All dot-like strokes are by convention counted as constituting a short stroke. Therefore, following Rule 1, they are considered to have two free endpoints even if the start and end are indistinguishable.
4. If all endpoints are free, the number of free endpoints is equal to double the stroke count (Table 4).
5. An endpoint is "lost" from a stroke when the stroke terminates by abutting onto another stroke (Table 5). For cases where abutments are found, the number of free endpoints is found by subtracting the number of abutments from two times the stroke count value.
6. If all of a component's strokes join end-to-end, the result is a component having no free endpoints (Table 6).

Figure 1B:
FIG. 1b illustrates a "true abutment" as described in Rule 7 of the endpoint conventions established in accordance with the present invention.

7. If two distinct components in close proximity create the appearance of near abutment, such "false abutments" 0101-0103 are to be ignored (FIG. 1a). Distinct components that are intentionally and traditionally joined are treated as having true abutments 0104 (FIG. 1b).

Looking up a word in a dictionary or other reference typically involves using one or more lookup keys. The lookup key leads to a result set consisting of items that match the initial search criteria. If the result set has more than one candidate matching the initial key, then the next step is to look through the result set for the exact item being sought, using whatever method may be appropriate.

For instance, in a Western language dictionary, a user will use the first letter of the word being sought as the initial search key. This will bring the user to a section of the dictionary that corresponds to that letter. From there, the user searches by alphabetical order, based on the subsequent letters in the word. This forms a kind of secondary search refinement method.

In the case of writing systems that employ Chinese-type characters, the traditional lookup method has employed radicals for keys, with the secondary selection method typically being the number of total or remaining strokes in the character. Within most dictionaries, the order of characters within the result set is random. As mentioned above, because many candidates may remain after these two steps are applied, finding a character in the randomly ordered result set can be tedious.

In this embodiment of the present invention the primary key is the character's core component. The core component is found by its stroke-endpoint classification, and this leads to a very short candidate result set containing the desired character.

In this respect, the classification method, system, and/or software of the present invention differ from the traditional radical system in a variety of important ways. For example, in the radical system, one has a limited set of initial keys (usually 214), and consequently the search result set is usually large. Typically, one then uses the residual stroke count to narrow down the result set, though even then it may be quite large and time-consuming to search through to find the desired character. In contrast, an embodiment of the present invention may include a greater number of keys, but because the keys themselves are subdivided by endpoint counts, finding the initial key may still be relatively fast. Further, on average the candidate result set may be significantly smaller, thereby greatly speeding up the search process.

Figure 1C:
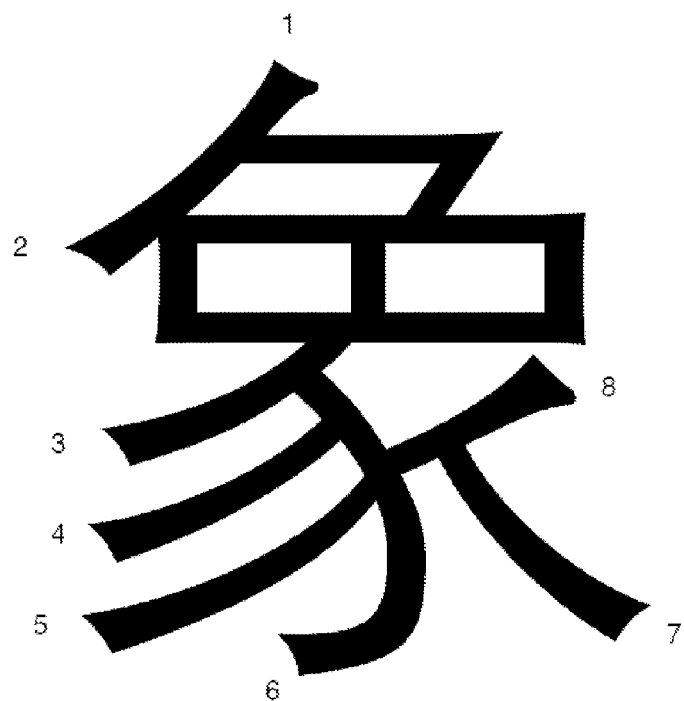
FIG. 1c shows an exemplary counting of endpoints for 象.

To look up a character, in an exemplary embodiment, one first determines its core component. Taking as an example the character cited earlier, 像, we find that the traditional radical is 亻, and the remaining non-radical portion is also the core component, namely 象. The stroke count for this component is 12, and as shown in FIG. 1c, the endpoint count is 8. Having determined the core component and calculated its {s.e} value, one can use the listing means to find the core component in the data, and from there, one can use the reference means to find the corresponding result set, which will be a family of three characters (象, 像, and 橡). This short result set contrasts with the 55-character result set generated using the radical method for Unicode characters (see, Table 7). While the exact reduction in the size of the result set will, of course, vary with the components, domain of characters and writing system involved, the reductions in search result set size made possible by the present invention are generally substantial, and often as great as an order of magnitude, as illustrated in the above example.

The embodiment described above illustrates a basic implementation of major features of the present invention. In other exemplary embodiments described below, additional features are added to this basic configuration to enhance functionality for the end-user.

Another exemplary embodiment of a method is described with reference to Tables 8a and 8b, and includes a step of applying stroke-endpoint classification to radicals only. The exact number of radicals depends on the writing system and radical scheme employed, but is typically 214 for traditional Chinese, Japanese, and Korean. Other schemes employ 227, 187, and 154 radicals. While, an exact number of radicals may vary, the overall method and operation of the embodiment is similar in any event.

The method can also include identifying and recording the relationships between all radicals and the domain of characters to which the embodiment is being applied. Non-radical components may not be identified, nor may their relationships to characters be established. The manner of recording these relationships can be realized in both paper-based and electronic embodiments, as described herein.

The method can also include providing a means to conveniently access radicals according to their stroke-endpoint classification. Table 9 shows a partial listing of radicals presented in this manner. Note that in paper-based formats, the listing of said radicals would appear similar to that in the table, though in electronic applications of this embodiment of the invention, a user interface might be provided to enable a user to input stroke and endpoint counts so as to access some portion of the table of data stored in memory.

The method can also include providing a reference table from radical to character such that a user can use the listing means described above to reach the target radical, and from the radical, the user can access a portion of characters. Characters could be provided in residual stroke order, for example, although other orderings may be used.

Although the result of applying stroke-endpoint classification to radicals only in the manner just described may be a lookup system (or classification/retrieval system) of reduced capacity compared to other embodiments of the present invention, this embodiment may make it easier to locate radicals, which is something that even users of traditional lookup systems are accustomed to using. Further, this embodiment can be easily incorporated into traditional dictionaries (either paper-based or electronic) with minimal alterations to the dictionary's layout and contents (an appropriate printed listing or electronic database of radicals in {s.e} order and reference numbers to characters may be needed), and thus may be valuable as an improvement to currently developed devices or published materials. In other words, this embodiment can be readily applied to pre-existing published materials in both paper-based and electronic formats.

To illustrate an embodiment that applies stroke-endpoint notation to radicals, Table 8a shows how many radicals the user would have to look through to find a four-stroke radical. Because the result set is 37 characters, scanning for the target radical is relatively time-consuming. By contrast, Table 8b shows the different result sets generated for every logical possible endpoint count (0-8). As can be seen from the table, in the case of four-stroke radicals, the average reduction in result size is 82.3%. This substantial reduction in result set size can make it possible for a user to save time when scanning for a target radical.

To look up a radical using the exemplary embodiment just described, one first determines stroke and endpoint count values for the desired radical. For instance, to look up the radical 木, one notes that its stroke.endpoint value is {4.6}.

The result set of radicals matching an {s.e} of {4.6} contains 9 radicals instead of the traditional result set of 33 radicals using only the stroke count value of 4. Once one has located the desired radical, one can continue to search for the desired character by traditional method, using the total or residual character stroke count.

As it turns out, of all 4-stroke radicals, the example just given provides the least effective reduction in the result set, specifically 75.7%. Other 4-stroke radicals would be reduced further than this, with the result set reduction ranging from 75.7% to 97.3% (see, Table 8b). The greatly diminished result sets shown in the table illustrate the potential for an embodiment to reduce the time needed to locate the desired radical.

Another exemplary embodiment of the present invention, described with reference to Tables 9 and 10, can be embodied in electronic or non-electronic format and include separate listings for radical and core components. This approach can provide a user with the option to look a character up using a hybrid approach in which the traditional radical method is supplemented by the stroke-endpoint classification method, and/or by the core component method. However, in either case, the search time for the key (whether radical or non-radical component) can be reduced by using stroke-endpoint pair values to reduce the result set containing the desired component.

Table 9 shows a selection of radicals ordered by stroke-endpoint classification, and Table 10 shows a selection of non-radicals ordered in the same way. For example, if the present embodiment were to be embodied in a paper-based format, Tables 9 and 10 could show page numbers or cross-reference numbers beneath each component (page numbers are not shown in the tables), for example. If realized in electronic format, the user would most likely click on or otherwise select the target search key, be it a radical or non-radical, so as to arrive at a character result set.

A method of this embodiment can include a step of identifying radical and non-radical components. The method can also include assigning stroke and endpoint counts to all radicals and non-radicals listed in the step above. The method can also include determining and recording the relationships between core components and characters. The implementation of determining and recording relationship records can be paper-based or electronic, as described above.

The method can also include providing a step for accessing radicals and/or core components via their associated {s.e} pair values. This step can also be paper-based or electronic, as described above.

The method can also include providing a step for accessing core components via their associated {s.e} pair values. The implementation of such a step can be paper-based or electronic, as described above.

The method can also include providing a reference means from radicals to characters. The realization of such means can be paper-based or electronic, as described above.

The method can also include providing a reference means from core components to characters. The realization of such means can be paper-based or electronic, as described above.

The method can also include providing a reference means from character to core components, and further, from core components to characters, such that a user can look up a character by entering a similar looking character that shares the core component finding the core component in question, and then finding the associated characters containing that core component.

The method can also include providing a reference means from character to recurring components, and further, from recurring components to characters, such that a user can look up a character by entering a similar looking character that shares the recurring component, finding the recurring component in question, and then finding the associated characters containing that recurring component.

An embodiment can make it possible for characters to be looked up by radical or non-radical (core) component using the stroke-endpoint which may provide a reduced result set.

In operation, the core component of the search target character can be determined. The stroke and endpoint counts of the present lookup key can be determined. If the lookup key is a radical, it can be looked up in the radical table (partially shown in Table 9), list, or other listing means according to {stroke.endpoint} pair value. Likewise, if the component being sought is not a radical, it can be looked up in the non-radical table (partially shown in Table 10). Either approach can yield an efficient and small character result set, from which the target character can be found. Note that if realized in electronic format, the above tables might take the form of cell matrices on a computer display screen. If realized on paper, the tables can show reference numbers or page numbers for each component, leading to a result set for the search key in question.

Another embodiment in accordance with the present invention is described with reference to Table 11. Table 11 shows how complex components can be subdivided into simpler components. In conducting such subdivisions, the elements identified in composite components need not be etymologically related. The identification of components employed in Chinese-type characters, and the assignment of stroke counts and endpoint counts to recurring components is conducted in a manner similar to that described above. In addition, the relations between composite recurring components—namely, those which can be construed as containing simpler components—and the simple components used to compose them are identified and recorded. The relation between simple and complex components is typically a many-to-many relation, as any given simple component may often be found in a plurality of complex components, and any given complex component usually contains a plurality of simple components. As a result, composite components can be readily found from simple components by looking them up in a table or some other search method, and conversely, simple elements can be found via the complex elements in which they are used. As described above, characters can be classified and grouped according to the significant (e.g., core) component method described in an exemplary embodiment above. However, an additional table may be added so that characters can be found from any constituent component. This latter functionality is more conveniently realized in electronic format, but can easily be provided in paper-based form as well.

An exemplary embodiment of a method can include identifying all (or a portion of) recurring components found in the domain of characters in question. Note that the resulting set of components will likely be larger than the set of core components, because in addition to core components there will be recurring components that do not fit the criteria of core components described above.

The method can also include assigning stroke and endpoint counts to recurring components, regardless of whether they are elemental or composite in nature.

The method can also including identifying and recording all relations (one-way or bidirectional) between the components and the domain of characters.

The method can include identifying and recording all relations (one-way or bidirectional) between elemental components and composite components.

The method can include providing a step for accessing components via the {s.e} value.

The method can include providing a listing for elemental components with associated stroke and endpoint counts. The method can include providing a reference means from elemental to composite components, and vice versa, as well as a listing means from composite to elemental components, and vice versa.

The method can include providing a reference means from components to characters.

As with embodiments of the invention described earlier, the recording of relations and the various listing and accessing means can be realized in both paper-based and electronic formats. Also, this embodiment can include features of the earlier embodiments, such as means to access core components specifically, or to access characters by radical. In the interest of clarity and the desire to distinguish this particular approach to realizing the invention, these additional, optional steps have not been listed above, however. It should be appreciated that a specific embodiment can include an appropriate combination of the various features of one or more embodiments depending on a contemplated use of that embodiment.

This embodiment can enable users to find a composite core component which is unknown based on a simpler elemental component that is more familiar, or at least, easier to find from its {s.e} value. This can be particular effective if realized in electronic format.

In operation, the above-described embodiment, can allow the use of simple components to locate complex (composite) components. For instance, to locate the component 加 one may look up either 力 under {2.4} or 口 under {3.0}. Of course, because this embodiment additionally can contain features of the earlier-described embodiment, one can also look up the complex component 加 directly as {5.4}, since 加 itself is a core component.

Another embodiment of the present invention, described with reference to Table 12, can also be realized in electronic or non-electronic format. In addition to any combination of features and functionality described above in the various embodiments, stroke-endpoint value pairs can be applied to the characters themselves. This means that it is possible to look up a character directly according to its {s.e} value without the use of radicals or other core or elemental components as an intermediate lookup step. In electronic formats, input and output fields would be provided as necessary for display and data input and output purposes. This embodiment can also be used with paper-based look up methods.

In addition to any steps needed to realize desirable functionality as described above in the various embodiments, a method of this embodiment can include the following steps. Stroke and endpoint counts of the characters contained in the domain of characters to which the invention is applied can be calculated. The method can include providing a means of accessing characters via their stroke and endpoint counts.

This embodiment can be particularly effective in cases where it is difficult to determine a character's radical or core component. Moreover, in cases of simple characters containing few strokes, looking them up directly by their {s.e} value without the intermediate step of using radicals or core components as a key is likely to be more efficient.

In using this method, one may simply count the number of strokes and free endpoints in the character and then look up the character directly without the intermediary of radicals or recurring elements. Take, for instance, the common character 事, which has no less than four candidate elements (一, 口, 亅, and ヨ) which might conceivably be the lookup radical in the traditional analysis. Moreover, there is no apparent most significant component, nor is there any clear way to know which component is least common. By counting the strokes and endpoints of 事 one arrives at an {s.e} value pair of {8.7}. For a paper-based format, one then looks up the character in the character listings under {8.7}. And for an electronic format, one uses this {s.e} value to search the character by whatever user interface is provided, and then checks the result set for the target character. In the latter case, a means for inputting the stroke and endpoint values is needed, together with an output display means. An input means can include a keyboard, mouse, stylus, audio input device, visual input device, gesture based input device, a signal input device, or the like. An output display can include a video screen, a print out, a tactile output device, an audio output device, a signal output device, and/or any other output suitable for outputting a result to a person or another computer or electronic system.

This embodiment can be especially effective in cases where the character is simple (having few strokes) and determining the radical or most significant component might involve guesswork or is difficult to determine a priori.

Another embodiment is described with reference to Tables 13 and 14. The traditional stroke count of radicals and characters has been established over years of lexicography. Unfortunately, there are occasionally cases where the traditional stroke count seems to be at odds with the stroke count principles usually laid out. The method of this embodiment can associate alternative stroke count values with such cases, as shown in Table 13. In the table, the columns show {s.e} values associated with the component shown on the row in question. The column labeled {s.e}#1 provides the first of two possible stroke count values, and the column labeled {s.e}#2 shows an alternative stroke count value. In these cases, one will observe differences in the "s" (first) value for each {s.e} pair.

Likewise, endpoint counts may appear to vary depending on the exact way that the character or component is drawn. For that reason, different fonts sometimes show different endpoint counts. This embodiment can help resolve such ambiguity by associating alternative endpoint values with the character or component in question.

Examples of the resolution of ambiguity via alternative endpoint counts are shown in Table 14. In the table, each row corresponds to a particular component. The column labeled {s.e}#1 shows one of a plurality of endpoint counts, and the columns labeled {s.e}#2 and {s.e}#3 show alternative endpoint counts. In these cases, one will observe differences in the "e" (second) value for each {s.e.} value pair.

In addition to the steps described above in the various embodiments, an embodiment can also include the following steps:

identifying and recording alternate stroke counts where there may be some ambiguity as to stroke count; and
identifying and recording alternate endpoint counts where there is some ambiguity as to endpoint count.

The step of providing alternative stroke and endpoint counts may apply to any of the aforementioned embodiments, and may be achieved in both electronic and non-electronic formats. The alternative stroke and endpoint values can be applied to all components and characters, or to any subset of components or characters, including radical components, non-radical components, elemental components, composite components, or the like. Moreover, although columns for two possible stroke counts are shown in Table 13, and columns for three possible endpoint counts are shown in Table 14, this embodiment of the invention is not limited to two or three alternative counts, respectively, and ideally provides only enough as necessary for each character. Thus, many components and characters will require no alternatives as there is no ambiguity, and other components may require several.

Optionally, the method can include enabling a user to select whether endpoint or stroke count alternatives are to be additionally displayed in the search result. Accordingly, while the initial search result screen would show compounds or characters containing the {s.e} value selected by the user, and paging up will reduce the stroke or endpoint count (whichever was designated for variation) incrementally, and paging down will increase the stroke or endpoint count (whichever was designated) incrementally. Alternatively, a separate GUI control can enable the user to incrementally "page up" or "page down" for either stroke or endpoint counts. This arrangement prevents the user from having to input a range, and enables him or her to simply input a "best guess."

Using this embodiment is similar to any of the other embodiments mentioned above. A difference may be that there is greater margin of error for determining stroke or endpoint counts. This margin of error safeguards against cases where the traditional stroke count is unintuitive, or where ambiguity in endpoint count enables one to construe more than one possibility.

Another exemplary embodiment is described with reference to Table 15. This embodiment can be implemented by assigning names, meanings or both to the components identified in any of the previous embodiments. In this manner, the components may be indexed by name and/or meaning, and may be remembered as such. In principle, it would be logical for names to correlate to the etymology of the component. In the case of non-electronic formats, a logical presentation of this data would be a table indexed by name or meaning ordered phonetically according the script system used. In the case of meanings, multiple entries per character are naturally allowed as most components have more than one meaning. In electronic formats, input and output fields would be provided as necessary for display and data input and output purposes.

In addition to conducting any of the steps described in earlier embodiments to achieve the functionality contained therein, the present embodiment can include the following step:

identifying the etymological meaning of every component used as a lookup key.

Note that although many components are traditionally considered a phonetic element, initially at one point in the etymology of characters, they inevitably depicted something concrete or symbolic. This concrete or symbolic name can serve as a meaning.

The method can also include recording or associating a name based on the meaning with the component. In electronic formats, names are ideally unique, and components of identical meaning can be indexed as shown in Table 15 (bird 1, bird 2, etc.). Searching would not have to entail the memory of numbers, as one could search for "bird #" where "#" counts as a wild card for any number. Other wild card symbols may be used, of course.

The method can also include providing a means for accessing components by their name or meaning.

The method can also include providing a reference and linking means to access characters via the component used as a lookup key.

As learners of the orthographies of Chinese, Japanese, Korean, or old Vietnamese become familiar with character make-up and etymology, it is only natural for them to come to know more about the meaning of the components used in characters. This embodiment of the invention can enable users to look up a component by name or meaning, which is advantageous when remembering the name and using that as the lookup means is faster than counting strokes and endpoints. It can also be helpful for students wishing to learn more about character composition.

Using this embodiment involves looking up a component out of a table or equivalent access means by using the component's name or meaning as the lookup key. In the case of paper-based formats, finding the name yields a list of one or more characters (Table 15). Reference or page numbers indexing an area containing component-related data can be shown for each component (not shown in the table). In the case of a database, a list of one or more components can be displayed on a screen or other output device after one inputs the name or meaning into an appropriate graphical user interface. From there, access to character data can be accomplished as described above in other embodiments of the invention.

Another embodiment is described with reference to Table 16. Due to various script reforms, notably the Japanese reforms of 1945 and the PRC reforms of 1949, there are characters and components that are now written using new graphemes. The result of such transformations is that components and characters can be represented by alternate versions. Thus, for instance, 單,单, and 単 are all the same because they are used in the same words but in different scripts. It is therefore helpful to keep track of the relations between components related by graphical alteration.

In addition to any of the above steps described in other embodiments, an embodiment can include the following steps: identifying the many-to-many relations between component variants; providing a means for accessing all components and their variants by stroke-endpoint classification; and providing a means for viewing alternate versions of a component accessed by classification such that when one variant is accessed using the means in step 2, all associated variants can be displayed in the result set.

Figure 2:
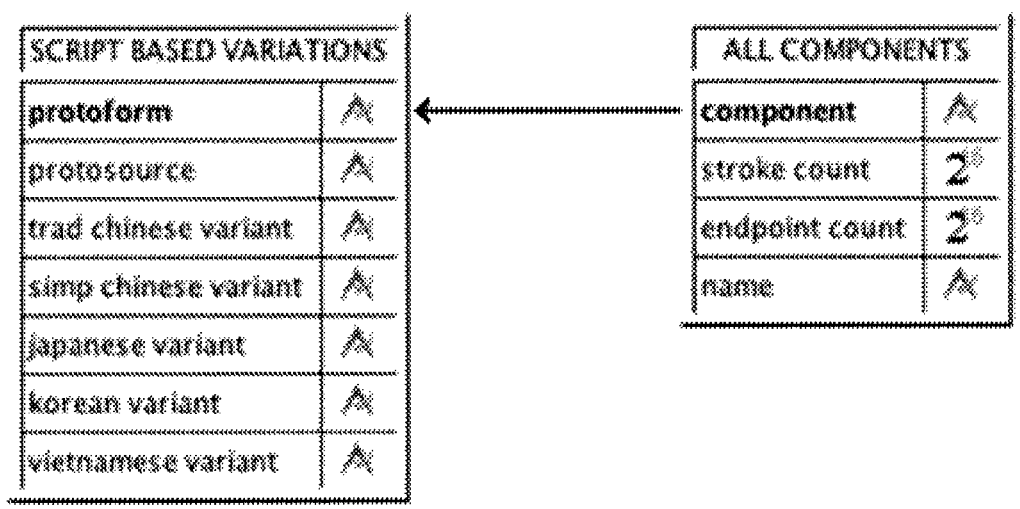
FIG. 2 shows an exemplary relational embodiment that makes it possible for script-based variations of components to be cross-referenced in electronic formats.

Table 16 shows how this data might be co-related in a table, using the example of the "word/speech" radical 言. FIG. 2 shows an example of an embodiment that could be used to store such data in a relational database. In electronic formats, a wide variety of graphical user interfaces could be used to realize the interface that the user employs to access and display grapheme variants.

There are a variety of possible embodiments of cross-referencing across scripts. In an electronic format, an input search field can enable a user to search a component by its {s.e} value. For instance, searching for 言 using an {s.e} of {7.8} would result in a set of components containing 言. By then selecting 言, a display means can display 言 and its variant forms, if any. Optionally, additional information about the languages where such variants are used could be displayed. A paper-based version of the embodiment could be implemented using a table that lists components by {s.e} order and contains fields showing alternative forms in other scripts. Note that for both electronic and paper-based formats of this embodiment, additional fields or columns may be provided to handle cases where more than one variant is found per script. For clarity, such additional fields and columns are not shown in the figures or tables.

Another embodiment can provide an ability to find a character based on any element contained therein, regardless of whether that element is elemental or composite, radical or non-radical, core or other. In addition to steps in an embodiment described earlier, this method can include identifying components existing in the domain of characters, regardless of type (radical, non-radical, elemental, composite, or core). The method can also include providing a means for accessing all components by {s.e} classification; and providing a reference means from the list of components to the characters that contain them, such that it is possible to access characters associated with any given component.

This embodiment can result in larger character result sets for a given search, but can be beneficial in cases where rare or unusual components will precisely result in a limited subselection of the domain of characters, regardless of whether the element is a core component or not. Moreover, it can be helpful in cases where researchers, for example, might want to study character relations. Finally, if functionality from previous embodiments of the invention is included, such that more precise lookup keys such as core components may be alternatively used, then this embodiment can be used "as a last resort" where, for whatever reason, a user has trouble identifying which radical or core component to use as a lookup key. In electronic contexts, this embodiment may therefore be configured so that a plurality of components may be used simultaneously as lookup keys, thus further reducing the result set generated during the search process.

Use of this method is similar to the other embodiments. To find a target character, one uses the means for accessing character components according to stroke-endpoint classification, and based on the result set, one can find the target search character. Because the listing means is similar to other tables shown, differing only in the number of elements contained in the table, a result table or figure would be similar to one or more of those described above.

Figure 3:
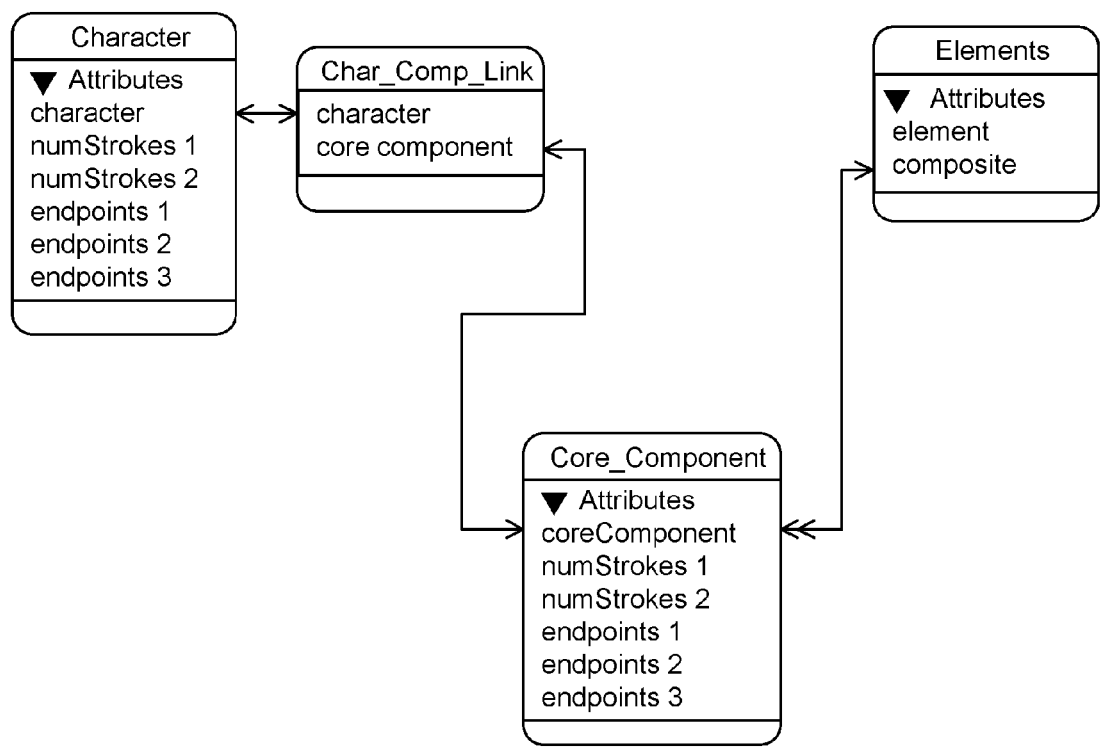
FIG. 3 shows an exemplary relational structure.

Another embodiment is described with reference to FIGS. 3 and 4. This embodiment combines the methods of any and all of the earlier-described embodiments, but fixes them in an in electronic format. Accordingly, a display device or other output means, a keyboard, electronic stylus, or other input means, short and long-term memory to store data, a computer processor, and database search and retrieval functions furnished via a software application can be provided so as to facilitate the lookup of characters and character components. FIG. 3 shows an exemplary data structure that could be embodied in a computer-readable medium and that would provide the features achieved in various embodiments described above. In FIG. 3, table names are shown in capital letters, bolded field names represent the key field for a corresponding table, and lines with arrows indicate the links between the tables. The relational structure between tables is such that the head of an arrow represents the "one file" and the tail (origin) of the line represents the "many file."

For example, to achieve the functionality described above in earlier embodiments using a relational database, four tables could used, namely—CHARACTERS, CORE COMPONENTS, ELEMENTS, and CHAR_COMP_LINK. Optionally, the ability to look up characters directly by stroke-endpoint notation can be provided, and the CHARACTERS table can include fields comprising the character itself, a stroke count field, and an endpoint field. In addition, to provide for the extra margin of error when users guess at a character's stroke count, an alternative stroke count field, and alternative endpoint fields can be added (FIG. 3). Searches for {s.e} values can be conducted using precise values (limiting the size of the result set) or using ranges (in cases where the user perceives some ambiguity). Display of search results can enable the viewing of results matching stroke or endpoint counts incrementally higher or lower than the user's guess by some form of page up or page down function, as described above.

The COMPONENTS table can contain a minimum of stroke count and endpoint fields, but can additionally contain a set of alternative stroke count and endpoint values (FIG. 3). Linking the CHARACTERS and COMPONENTS tables is CHAR_COMP_LINK, whose purpose is to realize a many-to-many relation between characters and components.

Finally, to realize the simple-complex distinction for components mentioned above, an additional table comprising ELEMENTS (simple components) can be provided. Logically, one approach could be to consider an element any component used to compose another, more complex component. Accordingly, the element field in the ELEMENTS table can comprise a list of components that cannot be further subdivided into a smaller grapheme. The relation between the COMPONENTS and ELEMENTS table is necessarily many-to-many, because each component may be associated with a plurality of elements, and each element may be associated with a plurality of components.

Figure 4:
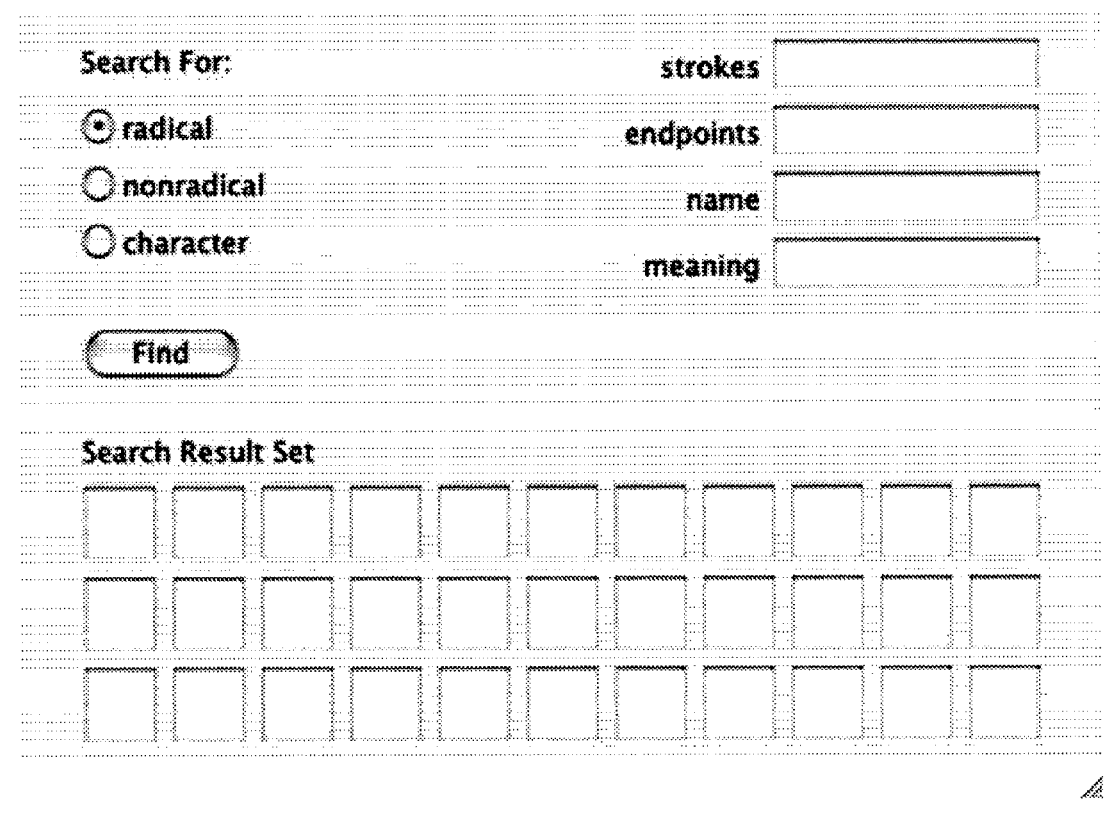

FIG. 4 provides an example of sample graphical user interface (GUI) of the kind that might be used to in accordance with an embodiment. This multipurpose interface can enable a user to choose a search target via radio buttons, for example, the options being radical component, non-radical component, any component, or character. The user can then choose one or more search criteria, whether strokes alone, strokes with endpoints, name, or meaning. As shown in FIG. 4, result sets could take the form of grid-shaped cell matrices. Clicking on one of the components in the result set (shown as empty boxes) can indicate that the target had been found. If the target was a radical or component, clicking on the target can then produce a new set of characters containing that radical or component. Such a result set can be shown in another window, though the graphical user interface could be implemented in various ways, as other implementations could be devised for use with one or more of the various embodiments. Additional data, including but not limited to component or character meanings, readings, and usage notes, can also be displayed with the search target. A graphical user interface or other means can be provided to search for components and/or characters by name and/or meaning, as shown in FIG. 4.

Alternative graphical user interfaces that are in keeping with the spirit of the present invention and useful with embodiments thereof could naturally be provided. For example, it is possible to devise a graphical user interface such that radical and non-radical components can be displayed in separate tables, such that both types of components could be used separately or in combination for lookup. For instance, one could search for a radical using search-endpoint keys, a non-radical by search-endpoint keys, and choose the radical and non-radical which are both found in the target character. Data associated with components and characters could also be displayed on-screen.

This embodiment can include a mapping of character components, not typically found in standard electronic character sets to glyphs identified as representing the various graphemes (components, core and non-core) as part of the classification method. In addition to the mapping (encoding) itself, one or more special fonts or font addendums can be prepared. Using current technologies, to display non-radical recurring components as text, one typically encodes them as user-defined characters so that they can be displayed on-screen. This technique is already well known, and is accomplished using one of a number of software applications that enable people to design their own fonts or add characters to existing fonts. Implementing an electronic format of an above embodiment can include a step of component glyph mapping and font addendum development.

In using this embodiment to search for a character, a user can determine which kind of lookup may be desired, for example a radical, non-radical recurring component, or character itself. Selecting a non-radical component or radical corresponding to the stroke-endpoint pair value can yield a set of characters matching the search criteria, at which point the user may select (or click on) the desired character. In cases where the search target is complex, components may be used in combination to further narrow the search result set. The search results are displayed on screen, and once the target is found, associated data is displayed where appropriate.

Because features of other embodiments can also be incorporated into this embodiment, it is possible to look up components by entering in their name, typing in their meaning, entering stroke and endpoint values by either typing them in or clicking on a matrix of numbers, for example, combining components, or even simply using radicals, which are also found using stroke-endpoint count. The search result is displayed, and at that point the user can select or click on the desired character or component to proceed further into the lookup process.

Another embodiment includes hosting data and an apparatus having one of the methods of the present invention embodied thereon on a web-server and providing access to the apparatus via the Internet. Thus, in addition to the memory, input means, display means, character mapping, and font addendum, the font can be downloadable to the user, or, alternatively, the data can be presented a non-encoded format for example PDF. Subsequently, the user accesses the data via the Internet using access techniques. In addition to the above embodiment, another embodiment of a method, system or software of the invention can include using a web service to provide access to the embodiment for input and/or output from/to a human operator or another software program or computer system.

For example, if a user wants to access a character or component, he can go online to the uniform resource locator URL where the lookup method is being hosted. To display character on the user's computer, a font may be downloaded from the URL. Alternatively, results can be displayed in pdf format or other platform-neutral format. This implementation of the lookup can make the system and method universally accessible.

Another embodiment of a method can provide a means to generate corpus-specific lookup charts and classification tables in accordance with the present invention. This embodiment is accomplished as follows:
  identifying components needed and preparing their mappings as described above.
The method can include obtaining a list of characters from the corpus for which charts and tables are to be provided; and using the corpus characters to generate a subset of characters, components, and relations from the invention, such that the relations and compounds and character data extracted relates to those of the corpus.

The method can also include generating tables based on the subset of relations corresponding to those of the corpus.

Essentially, this embodiment subtracts out components, characters, and relations that are not contained in the corpus from the entire body of components, characters, and relations contained in a complete implementation. (Note that a complete implementation of the present invention would most likely be based on Unicode, for example, though other very large character sets could also be used.) Once the subset of data has been obtained, it can be applied in an electronic context (portable electronic dictionary, PDA, cell phone, or the like) or it can be reduced to a printed version for incorporation into a printed-media publication, for example, a dictionary.

The manner used to implement and/or use this embodiment can depend on the database and programming language being used. For example, a relational database as a repository for the data can be used to constitute an embodiment, one simply obtains an electronic listing of the corpus characters, and generates sub-selections of the tabled data, via, for example, a set of scripts. This is straightforward for someone skilled in the use of a relational database that handles Asian characters. The resulting sub-selections can then be used as the basis for a new database mirroring an embodiment in structure, but containing only that portion of the data that is pertinent to a desired corpus. The result can then be transferred to the proper format for electronic context intended, or printed for use in printed-media dictionaries, for example.

Another embodiment can include the development of a teaching system that can be used as a training tool or aid for new and/or experienced users of an embodiment. Trial and error in implementation of prototypes of the present invention can easily identify components for which users have difficulty counting endpoint values. In addition, it is also possible to identify components whose endpoint counts vary depending on which font is used. In this embodiment, these ambiguous or difficult cases can be placed in a chart, with their true endpoints circled or otherwise highlighted, while leaving false endpoints unmarked. The components in the chart can be ordered by stroke and true endpoint values. The chart of difficult cases can then be used as a study aid, for example.

The chart of components containing difficult and ambiguous cases can be a starting point for training tools that teach users how to quickly correctly identify the correct endpoint count for important but ambiguous components. In this way, users can use an embodiment the present invention with greater precision and efficiency. In printed media, a separate table of difficult cases can also be provided for users who are in doubt about a particular element but don't want to have to look through the total body of components.

Any implementation using the list of difficult and ambiguous cases, including software guessing games, training programs, and the like would be in keeping with the spirit of the present embodiment of the invention.

Another embodiment can include a printed dictionary, a method of creating the same, whose contents are classified and arranged in accordance with the core component classification system of the present invention. Thus, characters are grouped into families using the core-component method, and the dictionary itself is organized by core components classified according to the stroke-endpoint method of the present invention. As a result, rather than having to use an intermediate table of core components to lookup characters, the user can search the dictionary directly for the target character.

For speedy lookup, indented thumb tabs indicating a stroke count value can be provided along the side opposite the binding. Within each stroke count section, sub-tabs or some similar sectioning device can be provided to indicate endpoint subsections within the stroke count section. At the start of each {s.e} subsection, a short table can list the core components with their corresponding page numbers. The table can also cross-reference core components easily misconstrued as having the {s.e} value in question.

The top or outer margin of each page within an {s.e} subsection can also list the core components having that value. The list of core components can follow the order in which they are presented within the {s.e} subsection. Some form of highlighting—including but not limited to bolding, italics, or color—can be used to indicate which core components on the header list are found on the current page. Core components listed before the highlighting are found on previous pages, and those after the highlighting can be found on subsequent pages. This can make it easy for the user to decide whether to page forward or backwards.

Within each family of characters sharing the same core component, characters can be listed in order of residual strokes. If two or more characters have the same number of residual strokes, they can be further ordered by the traditional radical order of the residual portion, if the residual portion in fact constitutes a radical.

A special table at the end or start of the dictionary can be provided to list difficult cases where the stroke-endpoint system might be difficult to apply with accuracy on the first attempt. Traditional indices may also be provided, including but not limited to indices by radical and reading.

There is no particular restriction as to the kind of data provided for each character, as a structure according to this embodiment can be readily applied to monolingual as well as to bilingual character dictionaries. Associated words may be listed with each character, together with usage information, etymologies, and/or the like.

For example, to lookup a character, a user can determine the character's core component and determine the stroke count. Using the stroke count tabs, the user can quickly arrive at an overall section of the dictionary containing characters whose core components have that many strokes. Sub-tabs or some similar device can further direct the reader to the appropriate endpoint values, with a table at each {s.e} subsection listing both the correct core components and those easily misconstrued for that level, with referencing page numbers. The user can then page forward using the highlighting key at the top of the page until he or she finds the core component for the character. The character will be found readily enough within the short list of characters represented. In the few cases where a core component family has many characters, the order of characters is further determined by the stroke count and/or radical order of the residual portion.

Figure 6:
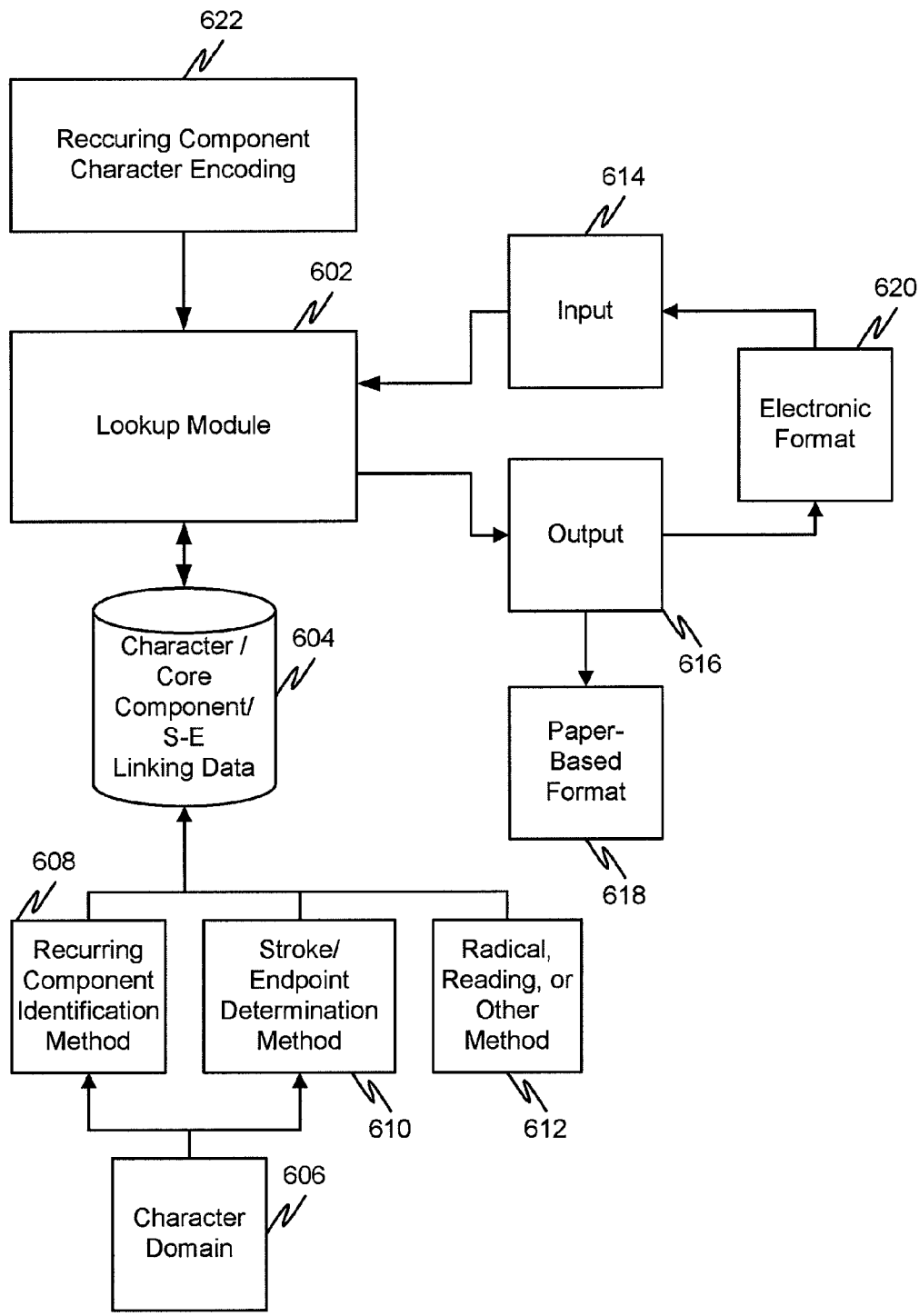
FIG. 6 shows a diagrammatic view of an exemplary embodiment including relationships between some exemplary methods, systems, and data.

FIG. 6 is a diagram of an exemplary embodiment of a system showing relationships between some exemplary methods, systems, and data. In particular, a system 600 includes a lookup module 602, a database 604, a character domain 606, a core component identification method (or process) 608, a stroke-endpoint determination method (or process) 610, a radical, reading, or other method (or process) 612, an input interface portion 614, an output interface portion 616, a paper-based output format 618, an electronic input/output format 620, and a recurring component character encoding 622.

In operation, the lookup module 602 is coupled to the database 604. The database 604 contains character, core component, recurring component and stroke-endpoint linking (association or relationship) data. The data in database 604 is based on the character domain 606 being processed according to the methods of 608-612.

Once the core component/stroke-endpoint/character association data is in the database 604, the lookup module 602 can access the database 604 in response to input received via the input interface portion 614. The lookup module 602 can generate output based on data from the database 604 and the recurring component character encoding 622. The recurring component character encoding 622 can include additional encoded characters to represent the core components or other recurring components that are not encoded as part of a conventional language encoding scheme. For example, the recurring component character encoding 622 could include core components and other recurring components, and, as mentioned above, core components in some cases are those components that are not the radical component (which would typically be included in conventional encoding). Thus the recurring component character encoding 622 provides a means or mechanism for a computer system to reference and display the recurring components and to display the recurring components.

The output interface portion 616 can be directed to a paper-based output format 618 (e.g., a printed index, a printed dictionary, or the like) or an electronic format 620 (e.g., computer, handheld electronic dictionary, or the like). In general, an embodiment similar to that shown in FIG. 6 may typically include links for recurring components as part of the package. In other words, electronically the problem of pages and pages of indexes may be somewhat avoided. So, for maximum freedom of choice, and thus, enhanced user flexibility, the user should be able to look things up four ways, including at least:

1) by radical;
2) by core component;
3) by other/any recurring component;
4) by name/meaning of component;
5) by looking up a character that shares the same core component as the target, finding the core component, and then finding that core component's family. Also, an embodiment can include means for inputting a character phonetically. This feature can be useful when the target character is rare and/or has an unknown reading, but shares features found in a common well-known character; and
6) phonetically (e.g., the traditional way).

Figure 7:
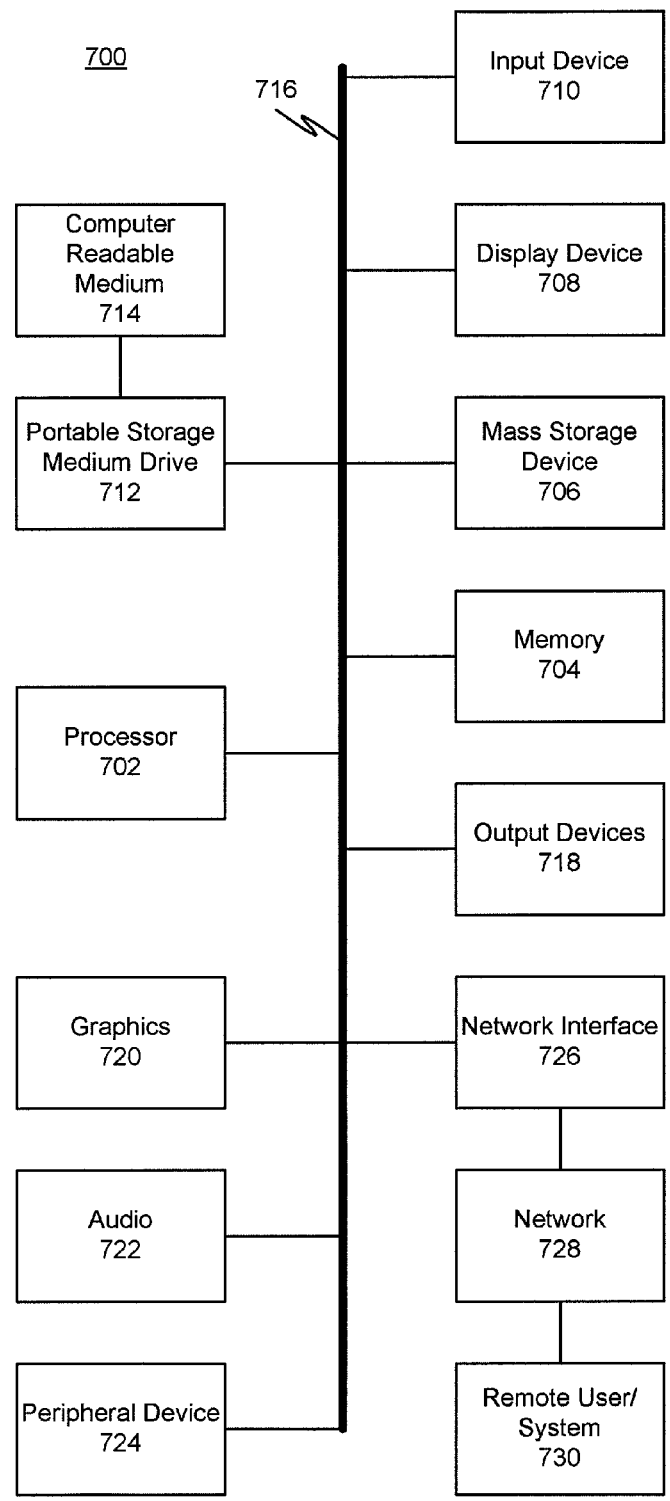
FIG. 7 is a block diagram of an exemplary computer system to implement one or more embodiments of a method or system.

FIG. 7 is a block diagram of an exemplary computer system that can be used to implement a method or system embodiment. The computer system 700 of FIG. 7 includes a processor 702 and memory 704. Processor 702 may contain a single microprocessor, or may contain a plurality of microprocessors for configuring the computer system as a multi-processor system. Memory 704 stores, in part, instructions and data for execution by processor 702. If the system of the present invention is wholly or partially implemented in software, including a computer program, memory 704 can be used to store the executable code when in operation. Memory 704 may include banks of dynamic random access memory (DRAM) as well as high-speed cache memory.

The system of FIG. 7 further includes a mass storage device 706, peripheral device(s) 724, input device(s) 710, portable storage medium drive(s) 712, computer readable medium 714, a graphics subsystem 720 and a display 708. For purposes of simplicity, the components shown in FIG. 7 are depicted as being connected via a single bus 716. However, the components may be connected through one or more data transport means. For example, processor 702 and memory 704 may be connected via a local microprocessor bus, and the mass storage device 706, peripheral device(s) 724, portable storage medium drive(s) 712, and graphics subsystem 720 may be connected via one or more input/output (I/O) buses. Mass storage device 706, which is typically implemented with a magnetic disk drive or an optical disk drive, is a non-volatile storage device for storing data and instructions for use by processor 702. In another embodiment, mass storage device 706 stores the computer program implementing the method of the present invention. The method of the present invention also may be stored in processor 702.

Portable storage medium drive 712 operates in conjunction with a portable non-volatile storage medium, such as a floppy disk, or other computer-readable medium, to input and output data and code to and from the computer system of FIG. 7. In one embodiment, the method of the present invention is stored on such a portable medium, and is input to the computer system 700 via the portable storage medium drive 712. Peripheral device(s) 724 may include any type of computer support device, such as an input/output (I/O) interface, to add additional functionality to the computer system 700. For example, peripheral device(s) 724 may include a network interface card for interfacing computer system 700 to a network, a modem, and the like.

Input device(s) 710 provide a portion of a user interface (UI). Input device(s) 710 may include an alpha numeric keypad for inputting alpha numeric and other key information, or a pointing device, such as a mouse, a trackball, stylus or cursor direction keys, or an image capture camera, or an OCR. All such devices provide additional means for interfacing with and executing the method of the present invention. In order to display textual and graphical information, the computer system 700 of FIG. 7 includes graphics subsystem 720 and display 708. Display 708 may include a cathode ray tube (CRT) display, liquid crystal display (LCD), other suitable display devices, or means for displaying, that enables a user to view the execution of the inventive method. Graphics subsystem 720 receives textual and graphical information and processes the information for output to display 708. Display 708 can be used to display component interfaces and/or display other information that is part of a user interface. The display 708 provides a practical application of the method of the present invention since the method of the present invention may be directly and practically implemented through the use of the display 708 and the input device(s) 710. The system 10 of FIG. 7 also includes an audio system 722. In one embodiment, audio system 722 includes a sound card that receives audio signals from a microphone that may be found in peripherals 724. Additionally, the system of FIG. 7 includes output devices 718. Examples of suitable output devices include speakers, printers, and the like.

The system of FIG. 7 also includes a network interface 726 coupled to a network 728 (e.g., the internet). A remote user or system 730 can access the classification and retrieval method executing on the processor 702 from across the network, The devices contained in the computer system of FIG. 7 are those typically found in general purpose computer systems, and are intended to represent a broad category of such computer components that are well known in the art. The system of FIG. 7 illustrates one platform which can be used for practically implementing the method of the present invention. Numerous other platforms can also suffice, such as Macintosh-based platforms available from Apple Computer, Inc., platforms with different bus configurations, networked platforms, multi-processor platforms, other personal computers, portable platforms (such as handheld electronic dictionaries, translators, or the like), workstations, mainframes, navigation systems, and the like.

Alternative embodiments of the use of the method of the present invention in conjunction with the computer system 700 further include using other display means for the monitor, such as CRT display, LCD display, projection displays, or the like. Likewise, any similar type of memory, other than memory 704, may be used. Other interface means, in addition to the component interfaces, may also be used including alpha numeric keypads, other key information or any pointing devices such as a mouse, trackball, stylus, cursor or direction key.

In a further embodiment, the present invention also includes a computer program product which includes a storage medium (media) having instructions stored thereon/in to program a computer to perform the method of interfacing of the present invention. The storage medium can include, but is not limited to, any type of disk including floppy disks, optical disks, DVD, CD ROMs, magnetic optical disks, RAMs, EPROM, EEPROM, magnetic or optical cards, or any type of media suitable for storing electronic instructions.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems and user applications. Ultimately, such computer readable media further includes software for performing the method of interfacing of the present invention as described above.

A user device or system for executing a method as described above can be a portable electronic device such as one (or a combination of more than one) of the following: a web-enabled device; a wireless telephone handset (e.g., Apple iPhone®); a personal digital assistant (PDA) such as a Blackberry®, Palm® computing device or the like; a handheld computer; a portable electronic dictionary; a laptop computer (or other type of portable computer such as a tablet computer); a smart phone; a media recorder such as a digital camera or digital video recorder; a digital media player such as an iPod®, an mp3 player, or a electronic book reader; a handheld game console; a personal navigation device; a converged device, or the like. The user device can also be a desktop computer such as an IBM-compatible personal computer (PC) or an Apple Mac®. In general, any now known or later developed device or combination of devices that can carry out the functions described above can be used with an embodiment of the present invention.

A software embodiment of the present invention can be purchased (or requested without charge, depending upon the application provider) and downloaded to a user device via a wired or wireless network. The AppStore by Apple is an example of a system for downloading software to portable devices.

An embodiment can include a method of systematically classifying the recurring components found in Chinese-type characters, including both radical and non-radical components.

At least one embodiment can provide a method of identifying a recurring component out of the set of components having the same stroke count.

At least one embodiment can provide a method for classifying Chinese-type characters in such a way that when identified by recurring component, the resulting selection is small, thus facilitating lookup.

At least one embodiment can provide a method for looking up characters using more than one constituent component, regardless of whether that component is one of the traditional radicals or a non-radical component.

At least one embodiment can provide a method for looking up characters easily by their {stroke.endpoint} count in cases where it may be difficult to determine which component constitutes the traditional radical.

At least one embodiment can provide a method for looking up complex components based on simpler component components, and vice versa.

At least one embodiment can provide a method for using a known character sharing a recurring or core component with the search target character as the starting point for search, whereby from the known character, one obtains the constituent components, and from among the constituent components, one employs the shared component as a means to identifying the search target character.

At least one embodiment can provide a method for students of the language, whether native or non-native, to better understand and appreciate character composition.

At least one embodiment can provide a method for looking up non-radical components by name or meaning.

At least one embodiment can provide a method for component and/or character classification that is readily grasped by the novice user of the language, and whose manipulation may require neither knowledge of how to pronounce the character nor a detailed understanding of the etymological stature of recurring components.

As described above with respect to one or more embodiments, it is possible to generate lookup tables for existing printed dictionaries by cross-referencing the list of characters located in the dictionaries to a database of all characters and components in the stroke-endpoint classification system. One practical question, however, is whether dictionary publishers would want to take the trouble to add additional character and component tables to dictionaries that have already been typeset. They might consider the costs prohibitive.

One solution, of course, is to create a self-contained booklet containing the requisite component and character lookup tables to be used as a supplement to an existing dictionary or other work. These could be arranged using an embodiment as described above. Either components or characters could be on separate tables, or the related characters could be on the same page as the corresponding core components. A variety of satisfactory configurations could be achieved.

Another approach, however, would be to embody one or more lookup tables, generated using an embodiment, as a volvelle resembling the "verb wheels" sometimes employed for verb conjugations in French and Spanish.

An embodiment of a method, system or software of the present invention can include a volvelle (also known as a "wheel chart", "circular ephemera", or "verb wheel") which can be a paper construction with rotating parts. The volvelle could be made from any suitable material (such as cardboard, metal, plastic, or the like) and include rotational or linear motion (similar to a slide rule). Data output from an embodiment can be arranged peripherally, centrifugally, and/or radially. The volvelle can use multiple concentric circles with pointers and may be die-cut.

An exemplary volvelle in accordance with the present invention can include a square or circular cardboard or thick paper base. Stroke counts could be indicated radially around the base, with greater arc being given to those stroke counts that have more core components associated with them. Rotating from the center of this base could be a circular sheet of paper of a somewhat thinner material with one section cut out. The cut out exposes the paper of the base beneath it. Radially along the sides of the section are indicators of endpoint values. The section would expose components or characters written on the base. Using this radial coordinate system, it is possible to designate stroke and endpoint values by rotating the inner wheel so that the section exposes the correct stroke count elements, and then looking down the endpoint indicators along the sides of the section to find the corresponding lookup key. If one finds what one expected to be the core component, then one has succeeded in identifying it as a core component, and has also succeeded in determining its stroke-endpoint value. The next step is to find the corresponding character.

On the other side of the volvelle can be a similar arrangement. Strokes can be indicated radially around the base and endpoints can be marked at increasing or decreasing radial distances along the sectional cutout. The difference is that on this side of the volvelle, characters corresponding to components are shown. Next to each character could be, for example, a dictionary page number containing the target character.

The relatively simple and inexpensive volvelle could be used as an index tool, thus making it possible for dictionary publishers to publish stroke-endpoint lookup means without re-typesetting their materials, for example. A volvelle embodiment could also be used as a stand-alone embodiment with no correlation to another reference work or dictionary.

With the advent of the electronic era and the ability to encode nonstandard characters and use them within relational databases, embodiments of the present invention can make it possible to classify Chinese-type characters and their recurring components based on stroke-endpoint counts that can reduce search times and may encourage attempts to conventionalize the stroke-endpoint/recurring component classification system described herein.

Although the description of the various exemplary embodiments above contains many specificities, these should not be construed as limiting the scope of the invention. Rather they merely provide illustrations of some of embodiments of the invention. For example, components could be further classified by location, or the notation could be slightly altered (x-y rather than x.y), and automatic linking between simple and complex components could be streamlined in an electronic table containing cells in a matrix. Moreover, any of the embodiments described above can be realized in both paper-based and electronic formats.

It should be appreciated that any steps described above may be repeated in whole or in part in order to perform a contemplated lookup task. Further, it should be appreciated that the steps mentioned above may be performed on a single or distributed processor. Also, the processes, modules, and units described in the various figures of the embodiments above may be distributed across multiple computers or systems or may be co-located in a single processor or system.

Figure 8:
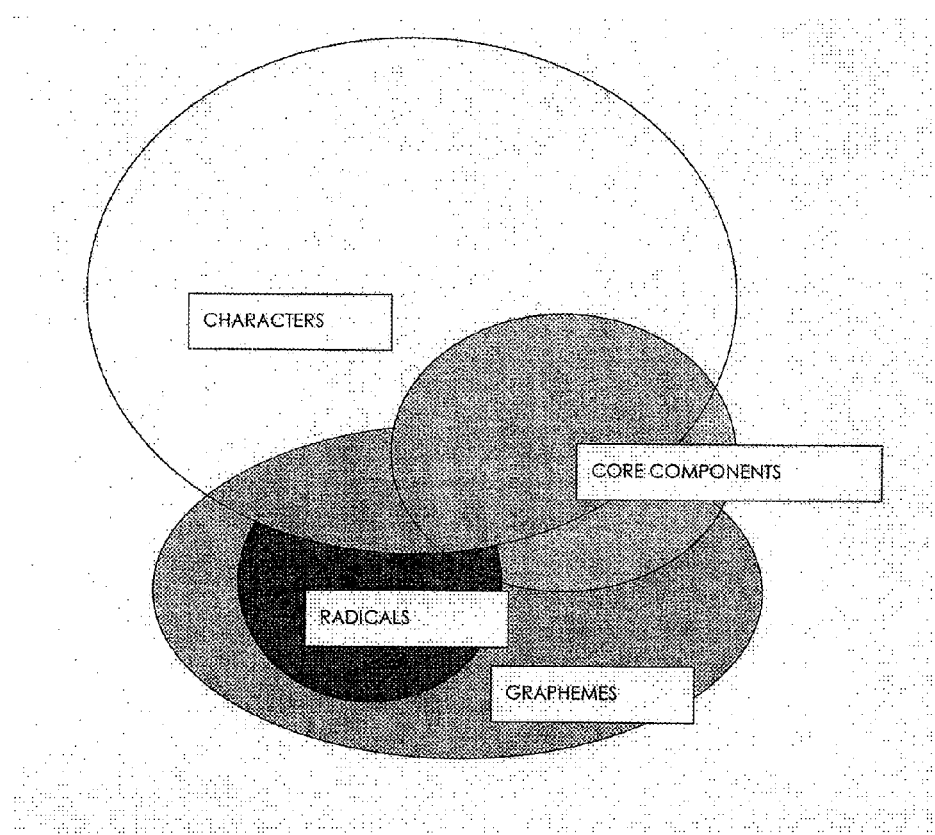
FIG. 8 is a diagram showing the relationship between characters, radicals, core components and other elements in a domain of characters.

FIG. 8 is a diagram showing the interrelation of characters, radicals, core components, and (elemental) graphemes. In particular, as can be seen in FIG. 8, there are more characters than anything else. Some core components are characters. Some consist of element graphemes. And a few are even radicals. All radicals are elements (graphemes). Some are also used as individual characters. And a small number are also used as core components. Graphemes are individual elements. Many are used as core components (more than the overlap suggests). Some are also characters. Radicals are a subset of graphemes. In principle, some radicals could be elemental graphemes, but I can't think of any off the top of my head. Note that core components, (elemental) graphemes, and radicals can all be thought of as recurring components which are either simple or complex.

Embodiments of the method, system and computer program product (i.e., software stored on/in a computer readable medium) for classification and lookup, may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic device such as a PLD, PLA, FPGA, PAL, or the like. In general, any process capable of implementing the functions or steps described herein can be used to implement embodiments of the method, system, or computer program product classification and lookup.

Furthermore, embodiments of the disclosed method, system, and computer program product for classification and lookup may be readily implemented, fully or partially, in software using, for example, object or object-oriented software development environments that provide portable source code that can be used on a variety of computer platforms. Alternatively, embodiments of the disclosed method, system, and computer program product for classification and lookup can be implemented partially or fully in hardware using, for example, standard logic circuits or a VLSI design. Other hardware or software can be used to implement embodiments depending on the speed and/or efficiency requirements of the systems, the particular function, and/or a particular software or hardware system, microprocessor, or microcomputer system being utilized. Embodiments of the method, system, and computer program product for classification and lookup can be implemented in hardware and/or software using any known or later developed systems or structures, devices and/or software by those of ordinary skill in the applicable art from the functional description provided herein and with a general basic knowledge of the computer and/or simulation arts.

Moreover, embodiments of the disclosed method, system, and computer program product for classification and lookup can be implemented in software executed on a programmed general-purpose computer, a special purpose computer, a microprocessor, or the like. Also, the classification and lookup methods of this invention can be implemented as a program embedded on a personal computer such as a JAVA® or CGI script, as a resource residing on a server or graphics workstation, as a routine embedded in a dedicated processing system, or the like. The methods and systems can also be implemented by physically incorporating the methods for classification and lookup into a software and/or hardware system, for example a computer software program, an electronic dictionary and/or translator.

It is, therefore, apparent that there is provided in accordance with the present invention, a method, system, and computer program product (computer readable medium) for classification and lookup or retrieval of Chinese-type characters. While this invention has been described in conjunction with a number of embodiments, it is evident that many alternatives, modifications and variations would be or are apparent to those of ordinary skill in the applicable arts. Accordingly, applicant intends to embrace all such alternatives, modifications, equivalents and variations that are within the spirit and scope of this invention.

TABLE 1

Core Components Illustrating Principles Outlined under First Mode

| Row No. | Rule | Illustrative Character | Commentary |
|---|---|---|---|
| 1 | 1 | 九 | The entire character is a recurring component so 九 is its own core component. |
| 2 | 2 | 旭 | 日 is a radical whereas 九 is not so 九 is the core component. |
| 3 | 3a | 閃 | Both 門 and 人 are radicals, but 人 is far less commonly used as a recurring component than 門. |
| 4 | 3b | 張 | Both 弓 and 長 are equally common as recurring components, but 長 serves as a phonetic component and therefore constitutes the core component. |
| 5 | 4 | 携 | 扌 and 隹 are both far more common than 乃, so 乃 is the core component. |
| 6 | 5 | 円 | This modern Japanese character has a monolithic structure that corresponds to no other elements in other graphemes. (Note that traditional Chinese reflexes of this character could be grouped.) |

TABLE 2

Sample Core Components and Associated Character Families

| Core Component | Associated Character Family |
|---|---|
| 凡 | 凡 帆 汎 瀜 |
| 九 | 九 究 染 旭 尻 軌 鳩 仇 |
| 乃 | 乃 携 盈 孕 |
| 人 | 人 囚 巫 閃 |
| 長 | 長 張 帳 脹 |

TABLE 3

One Stroke Elements Automatically Having Two Endpoints

| component | 一 | ㇄ | ㇋ | 乙 | ㇆ | ノ | 丨 | 丶 |
|---|---|---|---|---|---|---|---|---|
| {s.e} value | {1.2} | {1.2} | {1.2} | {1.2} | {1.2} | {1.2} | {1.2} | {1.2} |

TABLE 4

Elements with No Abutments: No. Endpoints = 2 × Strokes

| component | 九 | 乂 | 川 | 干 | 扌 | 又 | 寸 |
|---|---|---|---|---|---|---|---|
| {s.e.} value | {2.4} | {2.4} | {3.6} | {3.6} | {3.6} | {3.6} | {3.6} |

TABLE 5

Elements with One Abutment: No. Endpoints = ((2 × Strokes) − 1)

| component | 入 | 乛 | 亐 | 乃 | 火 | 毛 | 手 | 代 |
|---|---|---|---|---|---|---|---|---|
| {s.e.} value | {2.3} | {2.3} | {2.3} | {2.3} | {4.7} | {4.7} | {4.7} | {4.7} |

TABLE 6

Elements with No Free Endpoints

| component | 口 | 日 | 田 | 凸 | 阝 | 目 | 回 |
|---|---|---|---|---|---|---|---|
| {s.e.} value | {3.0} | {4.0} | {5.0} | {5.0} | {5.0} | {5.0} | {6.0} |

TABLE 7

Comparison of Result Sers When Searching 偉 Using the Radical System in Different Writing Systems Compared with Result Set When Using the Stroke-Endpoint Method of Present Invention

| Search System | Result Set Characters | Result Set Size |
|---|---|---|
| Traditonal Chinese | 國𡺳㳚洏溰㵝儌僟僎傯傡儀 僟傮僫僑傊僮儊傸儂㒒傡 | 28 |
| Simplified Chinese | 口口口口口口口⊏口口口口口口 僎僐僐偙僐僐僸傶傲儌伮倥 僐偣僐僐儇僈僐僫傮儌傓偭 俢偠偳僊偲僪儮偍 | 55 |
| Japanese | 儸僩儗儠僐僴僙儙僐僊儁傶儊 僀僀值僐儁僩□□□ | 24 |
| Korean | 儌僐儁僈儌僐僲儡僩儌僊僐僎儑 | 15 |
| Present Invention | 儝僐榡 | 3 |

Note:
All result sets take Unicode as the domain of characters.

TABLE 8a

Traditional Result Set for Radicals with Four Strokes

| {stroke count} | result set | result set size |
|---|---|---|
| 4 | 心戈戶手支攴文斗斤方无日曰月木欠止歹 殳毋比毛氏气水火灬爪父爻爿牙犬王壬 | 37 |

TABLE 8b

Result Sets for Radicals with Four Strokes and 0-8 Endpoints in Accordance with the Present Invention

| {s.e} | result set | result set size | % reduction |
|---|---|---|---|
| {4.0} | 日 | 1 | 97.3% |
| {4.1} | 曰 | 1 | 97.3% |
| {4.2} | 月 | 1 | 97.3% |
| {4.3} | 戶 | 1 | 97.3% |
| {4.4} | 斤毋氏 | 3 | 91.9% |
| {4.5} | 欠文方无止歹片 | 7 | 81.1% |
| {4.6} | 支攴殳比爻水木王壬 | 9 | 75.7% |
| {4.7} | 手支毛气火爪牛犬 | 8 | 78.4% |
| {4.8} | 心戈斗灬父爿 | 6 | 83.8% |
| Average reduction (weighted avg.) | | | 82.3% |

TABLE 9

Tables of Radicals Arranged by {Stroke.Endpoint} as Described in the Second and Third Modes

| 1.2 | 一 | 丨 | 丶 | 丿 | 乙 | 亅 | 亅 | 2.2 | 入 | 冂 |
| 冖 | 几 | 凵 | 匚 | 卩 | 巳 | 厂 | 2.3 | 十 | 人 | 亻 |
| 入 | 刀 | 勹 | 匕 | 匸 | 卜 | 厶 | 2.4 | 二 | 儿 | 八 |
| 冫 | 刂 | 力 | 匕 | 十 | 又 | 3.0 | 口 | 囗 | 3.1 | 尸 |
| 巳 | 己 | 3.2 | 弓 | 彐 | 阝 | 阝 | 3.3 | 宀 | 山 | 广 |
| 彐 | 3.4 | 夂 | 夕 | 子 | 屮 | 工 | 巾 | 幺 | 攵 | 辶 |
| 3.5 | 土 | 士 | 夂 | 大 | 女 | 尢 | 干 | 彳 | 犭 | 3.6 |
| 寸 | 小 | 艹 | 灬 | 巛 | 川 | 廾 | 弋 | 彡 | 忄 | 扌 |
| 氵 | 犭 | 艹 | 4.0 | 日 | 曰 | 4.1 | 曰 | 4.2 | 月 | |

TABLE 10

Tables of Non-Radical Components Arranged by {Stroke.Endpoint} as Described in the Third Mode

| 1.2 | 冖 | 乛 | 乛 | 乀 | 乚 | 一 | 丂 | 乁 | 乛 | 一 |
| L | 乙 | 〈 | 2.2 | 𠃌 | 冂几 | 夕 | 冖 | 𠃋 | 冖 |
| 丁 | 冂 | 𠘧 | 2.3 | 丁 | 屮 | 乃 | 亍 | 丂 | 亽 | 丁 |
| 乛 | 乚 | 匕 | 卜 | 丂 | 亼 | 2.4 | 丷 | 八 | 寸 | |
| 入 | 刂 | 卩 | 乂 | 七 | 刁 | | 乂 | 川 | 丬 | 九 | 八 |
| 彡 | 丷 | 乄 | 廾 | 十 | 丷 | 十 | 3.1 | 尸 | 尸 | 3.2 |
| 冂 | 3.3 | 丫 | 之 | 白 | 玉 | 乚 | 巳 | 广 | 3.4 | 兀 |
| 兀 | 巫 | 斤 | 氺 | 兀 | 土 | 圡 | 彡 | 夂 | 上 | 屮 |
| 万 | 廾 | 兀 | 乏 | 人 | 及 | 凸 | 丰 | 久 | 下 | 亡 |
| 勿 | 門 | 凡 | 广 | 3.5 | 幺 | | 巾 | 子 | 亻 | 宀 | 千 |
| 丂 | 毛 | 少 | 与 | 丂 | 勺 | | 午 | 于 | 广 | 刃 | 才 |

TABLE 11

Sample Parsing of Composite Grapheme into Elemental Constituents

| Composite Component | Elemental Component |
|---|---|
| 支 | 十, 又 |
| 付 | 亻, 寸 |

TABLE 12

Sample Application of {Stroke.Endpoint} Values to Characters

| character | {s.e.} pair value |
|---|---|
| 勿 | {4.5} |
| 事 | {8.8} |

TABLE 13

Sample Resolution of Stroke Count Ambiguity

| Component | {s.e} #1 | {s.e} #2 |
|---|---|---|
| 阝 | {2.2} | {3.2} |
| 臣 | {3.3} | {4.3} |

TABLE 14

Sample Resolution of Endpoint Ambiguity

| Component | {s.e} #1 | {s.e} #2 | {s.e} #3 |
|---|---|---|---|
| 乗 | {7.11} | {7.12} | {7.13} |
| 長 | {8.8} | {8.9} | |
| 心 | {4.8} | {4.7} | |
| 受 | {8.14} | {8.13} | |

TABLE 15

Sample Names and Meanings Assigned to Recurring Elements

| Component | Name (Unique) | Meaning |
|---|---|---|
| 鳥 | bird 1 | bird |
| 鸟 | bird 2 | bird |
| 奮 | bird flaps wings 1 | bird flaps wings |
| 翟 | bird flaps wings 2 | bird flaps wings |
| 翟 | bird flaps wings 3 | bird flaps wings |
| 鷺 | heron 1 | heron |
| 鵲 | magpie | bird |
| 隹 | old bird | bird |

TABLE 16

Sample of Paper-Based Recordkeeping of Script-Based Component Variation

| {s.e} | RC | P | TC | SC | J | K | V |
|---|---|---|---|---|---|---|---|
| 2.4 | 讠 | | 言 | 讠 | 言 | 言 | 言 |
| ... | | | | | | | |
| 7.8 | 言 | | 言 | 讠 | 言 | 言 | 言 |

RC => recurring component
P => protosource form
TC => traditional Chinese form
SC => simplified Chinese form
J => Japanese form
K => Korean form
V => Vietnamese form

What is claimed is:

1. A method for computerized classification and retrieval of characters in a domain of characters having recurring character components, the method comprising:
provideing a database including the domain of characters;
identifying, within the domain of characters, a plurality of recurring character components, wherein each recurring character component is a grapheme used to compose characters;
identifying a stroke count for each of the recurring character components;
identifying a free endpoint count for each of the recurring character components, wherein a free endpoint is an endpoint of a stroke that does not abut another stroke;
classifying each of the recurring character components according to a stroke-endpoint value pair determined for that recurring character component, the stroke-endpoint value pair being based on the stroke count and the free endpoint count identified for that recurring component;
identifying relationships between each recurring character component and one or more characters, a relationship being identified when a character includes the recurring character component;
recording identified relationships in the database by storing a plurality of relational entries in the database, each relational entry corresponding to a bidirectional association between a recurring character components and respective related characters;
receiving an input stroke-endpoint value pair via a user interface and using the received stroke-endpoint value pair to access the database and retrieve a group of one or more of the recurring character components corresponding to the received stroke-endpoint value pair;
generating a group of one or more recurring character components corresponding to the received stroke-endpoint value pair;
receiving, via the user interface, an indication of a selected target recurring character component from among the group of recurring character components corresponding to the received stroke-endpoint value pair;
retrieving characters in the database having a relationship to the target recurring character component; and
generating a list of characters based on the target recurring character component and providing the list of characters to the user interface as output.

2. The method of claim 1, wherein the recurring character components constitute radicals.

3. The method of claim 1, wherein the recurring character components constitute core components.

4. The method of claim 1, wherein the recurring character components include radicals, core components, and any other identifiable recurring component.

5. The method of claim 4, further comprising:
determining a stroke count and endpoint value for each of the characters in the domain of characters; and
associating a stroke-endpoint value pair to each character within the domain of characters.

6. The method of claim 1, wherein the user interface comprises an input device configured to receive input from a user including stroke-endpoint value pairs and selection indications and a display device configured to display characters, stroke-endpoint value pairs, and recurring components.

7. The method of claim 1, wherein the user interface includes a software interface configured to allow another computer to lookup and retrieve characters from the database.

8. The method of claim 5, wherein access means for each character of the domain of characters includes means for directly accessing a character of the domain of characters using only the input stroke-endpoint value pair for that character.

9. The method of claim 1, further comprising generating a character encoding to supplement an existing character encoding and to provide means for referencing and displaying recurring components.

10. The method of claim 1, further comprising: identifying and recording alternative stroke-endpoint value pairs for those recurring components having features subject to being interpreted as having a plurality of stroke-endpoint value pairs.

11. The method of claim 1, further comprising:
identifying an etymological meaning of each recurring component;

associating a name to each recurring component, the name being based on the etymological meaning; and providing a name-based access means for accessing the database to retrieve a recurring component based on a name input via the user interface.

12. The method of claim 11, further comprising:

identifying and recording relations between and among recurring components that are considered variants of one another; and providing means to access a recurring component based on one of its related variant graphemic versions.

13. The method of claim 11, further comprising:

providing means for freely and directly inputting a character that shares a recurring component with a search target character;

providing means for generating a list of constituent recurring components of said character;

providing means for selecting one of said constituent recurring components; and generating a list of characters containing said selected constituent recurring component.

14. A method for generating an index of characters in a domain of characters having recurring character components, the method comprising:

providing a database including the domain of characters;

identifying recurring character components that occur within the domain of characters, wherein each recurring character component is a grapheme used to compose characters;

determining a stroke count for each recurring character component;

determining a free endpoint count for each recurring character component, wherein a free endpoint is an endpoint of a stroke that does not abut another stroke;

classifying each of a plurality of recurring character components according to a stroke-endpoint value pair corresponding to the stroke count and endpoint count determined for that recurring character component;

identifying relationships between each recurring character component and one or more characters, the relationships being identified when a character includes the recurring character component;

recording identified relationships in the database by storing a plurality of relational entries in the database indicating associations between recurring character components and their respective related characters;

for each stroke-endpoint value pair, accessing the database and retrieving a group of one or more recurring character components corresponding to the stroke-endpoint value pair, and generating a list of characters related to each of the recurring character components associated with the stroke-endpoint value pair; and generating the index ordered according to stroke-endpoint value pair and having a plurality of sections, wherein each section is based on one of the stroke-endpoint value pairs and includes subsections based on recurring character components associated with the stroke-endpoint value pair, each recurring character component further containing a listing of the characters associated with that recurring character component.

15. The method of claim 14, wherein the recurring character components constitute radicals.

16. The method of claim 14, wherein the recurring character components constitute core components.

17. The method of claim 14, wherein the recurring character components include radicals and core components.

18. The method of claim 14, further comprising:

determining a stroke-endpoint value pair for each character in the domain of characters;

associating the stroke-endpoint value pair with the corresponding character; and generating an index of characters ordered by stroke-endpoint value pair and having a plurality of sections, each section listing the characters corresponding to that stroke-endpoint value.

19. The method of claim 14, 15, 16, 17, or 18 further comprising generating an index.

20. The method of claim 14 further comprising an ordered dictionary comprising:

a plurality of first section markings, each first section marking corresponding to a section associated with a stroke count for core components in that section;

a plurality of sub-section markings, each subsection marking corresponding to an endpoint value for core components having the stroke value for the section, wherein each subsection contains core components and associated lexical data having the section stroke count value and the subsection endpoint value.

21. The method of claim 20, further comprising:

a table at the start of each subsection listing recurring components in that subsection; ordered lists of recurring components positioned in a margin of the dictionary and placed according to stroke-endpoint value of the sections and subsections, wherein recurring components found on the page are highlighted and recurring components found on previous pages are listed before the highlighted recurring components and recurring components found on subsequent pages are listed after the highlighted recurring components.

22. The method of claim 20, wherein characters within each subsection are further ordered according to residual stroke value or traditional radical.

23. An electronic dictionary comprising:

a processor;

a memory coupled to the processor and having stored therein a database containing a plurality of character records, a plurality of recurring character component records each including a primary stroke-endpoint value pair, and a plurality of relation entries associating a recurring component with one or more character records, wherein the primary stroke-endpoint value pair includes a free endpoint count and stroke count of the recurring character component record, wherein a free endpoint is an endpoint of a stroke that does not abut another stroke, and wherein each recurring component is a grapheme used to compose characters;

a display device coupled to the processor; and an input device coupled to the processor, wherein the memory includes instructions that when executed cause the processor to perform a series of steps including:

receiving an input stroke-endpoint value pair via the input device and using the received stroke-endpoint value pair to access the database and retrieve a group of one or more of the recurring character components corresponding to the received stroke-endpoint value pair;

displaying the group of recurring character components on the display device;

receiving, via the input device, an indication of a selected target recurring character component from among the displayed group of recurring character components;

retrieving characters from the database having a relationship to the target recurring character component; and displaying the retrieved characters.

24. The system of claim 23, wherein the input device and display device are coupled to the processor via a computer network.

25. The system of claim 23, wherein the electronic dictionary is a portable electronic dictionary.

* * * * *